US00RE50429E

(19) United States
(12) Reissued Patent
Nam et al.

(10) Patent Number: US RE50,429 E
(45) Date of Reissued Patent: May 13, 2025

(54) STORAGE DEVICES, STORAGE SYSTEMS AND METHODS OF OPERATING STORAGE DEVICES

(71) Applicant: SAMSUNG ELECTRONICS CO., LTD., Suwon-si (KR)

(72) Inventors: Suck-Hyun Nam, Hwaseong-si (KR); Gun-Bae Kim, Seongnam-si (KR); Hee-Jong Kim, Seoul (KR); Min-Sung Kil, Hwaseong-si (KR); Su-Yong An, Asan-si (KR)

(73) Assignee: SAMSUNG ELECTRONICS CO., LTD., Suwon-si (KR)

(21) Appl. No.: 18/125,501

(22) Filed: Mar. 23, 2023

Related U.S. Patent Documents

Reissue of:
(64) Patent No.: 10,955,891
Issued: Mar. 23, 2021
Appl. No.: 16/184,229
Filed: Nov. 8, 2018

(30) Foreign Application Priority Data

Jan. 22, 2018 (KR) ..... 10-2018-0007489

(51) Int. Cl.
*G06F 1/32* (2019.01)
*G06F 1/26* (2006.01)
(Continued)

(52) U.S. Cl.
CPC ..... *G06F 1/3296* (2013.01); *G06F 1/263* (2013.01); *G06F 1/266* (2013.01); *G06F 1/28* (2013.01);
(Continued)

(58) Field of Classification Search
CPC ..... G06F 1/3296; G06F 1/3275; G06F 1/28; G06F 1/263; G06F 1/3206; G06F 1/3268;
(Continued)

(56) References Cited

U.S. PATENT DOCUMENTS 7,389,403 B1 6/2008 Alpert et al.
7,679,133 B2 3/2010 Son et al.
(Continued)

FOREIGN PATENT DOCUMENTS

CN 101122865 A 2/2008
JP 2013-250616 12/2013
(Continued)

OTHER PUBLICATIONS

Office Action dated Jul. 9, 2020 in corresponding U.S. Appl. No. 16/184,229.

*Primary Examiner* — Matthew E Heneghan
(74) *Attorney, Agent, or Firm* — MORGAN, LEWIS & BOCKIUS LLP

(57) ABSTRACT

A storage device includes nonvolatile memory devices that store data, a storage controller, and an adaptive power supply circuit. The storage controller controls the nonvolatile memory devices. The adaptive power supply circuit generates at least one operation voltage based on at least one power supply voltage, and provides the at least one operation voltage to the nonvolatile memory devices and the storage controller. The at least one power supply voltage is provided to the adaptive power supply circuit through a portion of power lines connected to a host. Under control of the storage controller, the adaptive power supply circuit adaptively activates a power disable function associated with a provision of the at least one operation voltage according to a level of a third power supply voltage provided through a third power line of the plurality of power lines. The third power supply voltage is provided by the host.

34 Claims, 24 Drawing Sheets

(51) Int. Cl.

| | |
|---|---|
| ***G06F 1/28*** | (2006.01) |
| ***G06F 1/30*** | (2006.01) |
| ***G06F 1/3206*** | (2019.01) |
| ***G06F 1/3234*** | (2019.01) |
| ***G06F 1/3296*** | (2019.01) |
| ***H02J 1/14*** | (2006.01) |
| ***H02J 7/34*** | (2006.01) |

(52) U.S. Cl.
CPC ..... *G06F 1/305* (2013.01); *G06F 1/3206* (2013.01); *G06F 1/3268* (2013.01); *G06F 1/3275* (2013.01); *H02J 1/14* (2013.01); *H02J 7/34* (2013.01); *Y02D 10/00* (2018.01)

(58) Field of Classification Search
CPC .. G06F 1/305; G06F 1/266; G06F 1/26; H02J 1/14; H02J 7/34; Y02D 10/00
See application file for complete search history.

(56) References Cited

U.S. PATENT DOCUMENTS

| | | | |
|---|---|---|---|
| 8,553,466 | B2 | 10/2013 | Han et al. |
| 8,559,235 | B2 | 10/2013 | Yoon et al. |
| 8,654,587 | B2 | 2/2014 | Yoon et al. |
| 8,923,088 | B2 | 12/2014 | Chen et al. |
| 9,213,400 | B2 | 12/2015 | Wells |
| 9,244,519 | B1 | 1/2016 | Ellis et al. |
| 9,684,359 | B2 | 6/2017 | Kunishige |
| 10,955,891 | B2 | 3/2021 | Nam et al. |
| 2007/0070766 | A1 | 3/2007 | Kim |
| 2008/0229121 | A1 | 9/2008 | Lassa et al. |
| 2011/0233648 | A1 | 9/2011 | Seol et al. |
| 2014/0108835 | A1* | 4/2014 | Park ..... G06F 1/26 713/320 |
| 2015/0026493 | A1 | 1/2015 | Kim et al. |
| 2015/0160713 | A1 | 6/2015 | Lo |
| 2016/0054942 | A1 | 2/2016 | Yu et al. |
| 2016/0181801 | A1 | 6/2016 | Shimizu et al. |
| 2017/0075403 | A1 | 3/2017 | Kimura |
| 2017/0140825 | A1* | 5/2017 | Park ..... G06F 3/0688 |
| 2018/0005697 | A1 | 1/2018 | Park et al. |

FOREIGN PATENT DOCUMENTS

| | | |
|---|---|---|
| KR | 10-2007-0036601 | 4/2007 |
| KR | 10-2012-0047052 | 5/2012 |
| KR | 10-2015-0009295 | 1/2015 |
| KR | 10-2018-0002939 | 1/2018 |

* cited by examiner

FIG. 5

| NAME | INDEX |
|---|---|
| P1 | 3.3V POWER |
| P2 | 3.3V POWER |
| P3 | PWDIS FUNCTION, (DEVSLP FUNCTION) |
| P2 | GND |
| P5 | GND |
| P6 | GND |
| P7 | 5V POWER, PRE-CHARGE |
| P8 | 5V POWER |
| P9 | 5V POWER |
| P10 | GND |
| P11 | DEVICE ACTIVITY SIGNAL, STAGGERED SPIN-UP SIGNAL |
| P12 | GND |
| P13 | 12V POWER, PRE-CHARGE |
| P14 | 12V POWER |
| P15 | 12V POWER |

FIG. 6F

| PEBS | VES3(P3) | PWDIS | LSEN | LSENC |
|---|---|---|---|---|
| PWDIS DISABLE | 0V~VREF1 | INACTIVE | HIGH | HIGH |
| | VREF1~3.3V | INACTIVE | HIGH | HIGH |
| PWDIS ENABLE | 0V~VREF1 | INACTIVE | HIGH | HIGH |
| | VREF1~3.3V | ACTIVE | HIGH | LOW |

BLKi

STORAGE DEVICES, STORAGE SYSTEMS AND METHODS OF OPERATING STORAGE DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority under 35 USC § 119 to Korean Patent Application No. 10-2018-0007489, filed on Jan. 22, 2018, the disclosure of which is incorporated by reference herein in its entirety.

TECHNICAL FIELD

Exemplary embodiments of the present inventive concept relate to storage devices, storage systems, and methods of operating storage devices.

DISCUSSION OF THE RELATED ART

Data storage systems come in a myriad of configurations, but generally include a host and a storage device. In this context, a "storage device" refers to a semiconductor memory device, an arrangement of multiple semiconductor memory devices, a peripheral device, etc. The host and the storage device may be electrically connected to each other using a variety of standardized and/or custom interfaces.

Standardized interfaces commonly used to connect contemporary hosts with a variety of storage devices include, for example, the serial ATA (SATA), universal flash storage (UFS), small computer small interface (SCSI), serial attached SCSI (SAS), embedded multimedia (eMMC), universal serial bus (USB) 3.0, FC, UHS-II, Light-peak, etc. In this context, the term "standardized interface" denotes the hardware used to implement the mechanical and/or electrical interconnections between a host and storage device, and/or at least one data communication protocol that define the commands, instructions, timing, signal exchanges, and data structures enabling the transfer of data between the host and storage device. The SATA interface includes a data segment and a power segment.

SUMMARY

According to an exemplary embodiment of the present inventive concept, a storage device includes a plurality of nonvolatile memory devices that store data, a storage controller, and an adaptive power supply circuit. The storage controller controls the plurality of nonvolatile memory devices. The adaptive power supply circuit generates at least one operation voltage based on at least one power supply voltage, and provides the at least one operation voltage to the plurality of nonvolatile memory devices and the storage controller. The at least one power supply voltage is provided to the adaptive power supply circuit through a portion of a plurality of power lines connected to a host. Under control of the storage controller, the adaptive power supply circuit adaptively activates a power disable function associated with a provision of the at least one operation voltage according to a level of a third power supply voltage provided through a third power line of the plurality of power lines. The third power supply voltage is provided by the host.

According to an exemplary embodiment of the present inventive concept, a storage system includes a storage device and a host. The storage device receives data through a data line and receives a plurality of power supply voltages through a plurality of power lines. The host is connected to the storage device through the data line and the power lines, and controls the storage device. The storage device includes a plurality of nonvolatile memory devices that store data, a storage controller, and an adaptive power supply circuit. The storage controller controls the plurality of nonvolatile memory devices. The adaptive power supply circuit generates at least one operation voltage based on at least one power supply voltage, and provides the at least one operation voltage to the plurality of nonvolatile memory devices and the storage controller. The at least one power supply voltage is provided to the adaptive power supply circuit through a portion of the power lines. Under control of the storage controller, the adaptive power supply circuit adaptively activates a power disable function associated with a provision of the at least one operation voltage according to a level of a third power supply voltage provided through a third power line of the plurality of power lines. The third power supply voltage is provided by the host.

According to an exemplary embodiment of the present inventive concept, a method of operating a storage device includes determining, in a storage controller, whether the storage device and a host support a power disable function. The storage device includes the storage controller and a plurality of nonvolatile memory devices that store data, and the storage controller is configured to control the nonvolatile memory devices. The host provides the data and a plurality of power supply voltages to the storage device. The method further includes generating, in a power management integrated circuit (PMIC), a first operation voltage and a second operation voltage based on a first power supply voltage and a second power supply voltage from among the plurality of power supply voltages. The power disable function is adaptively activated, in the storage controller, according to a level of a third power supply voltage from among the plurality of power supply voltages, based on determining whether the storage device and the host support the power disable function.

According to an exemplary embodiment of the present inventive concept, a storage device includes a plurality of nonvolatile memory devices that store data, a storage controller configured to control the plurality of nonvolatile memory devices, and an adaptive power supply circuit configured to generate at least one operation voltage based on at least one power supply voltage, and to provide the at least one operation voltage to the plurality of nonvolatile memory devices and the storage controller. The at least one power supply voltage is provided to the adaptive power supply circuit through a portion of a plurality of power lines connected to a host. Under control of the storage controller, the adaptive power supply circuit is configured to adaptively activate a power disable function according to a level of a third power supply voltage provided through a third power line of the plurality of power lines. The third power supply voltage is provided by the host, the storage device is compatible with a SATA 3.3 specification, the host is not compatible with the SATA 3.3 specification, and the third power line is designated to supply a non-signal.

Accordingly, a storage device adaptively activates the setting of a power disable function of an adaptive power supply circuit based on whether a host and the storage device support the power disable function. Therefore, the storage device may be compatible with the host when the host does not provide the power disable function. Therefore, performance of the storage device may be improved.

BRIEF DESCRIPTION OF THE DRAWINGS

The above and other features of the present inventive concept will become more apparent by describing in detail exemplary embodiments thereof with reference to the accompanying drawings, in which:

FIG. 5 is a table illustrating an example of the power lines in FIG. 4 according to an exemplary embodiment of the present inventive concept.

FIG. 6F is a table illustrating levels of various signals in FIGS. 6A through 6E according to an exemplary embodiment of the present inventive concept.

DETAILED DESCRIPTION OF THE EXEMPLARY EMBODIMENTS

Figure 1:
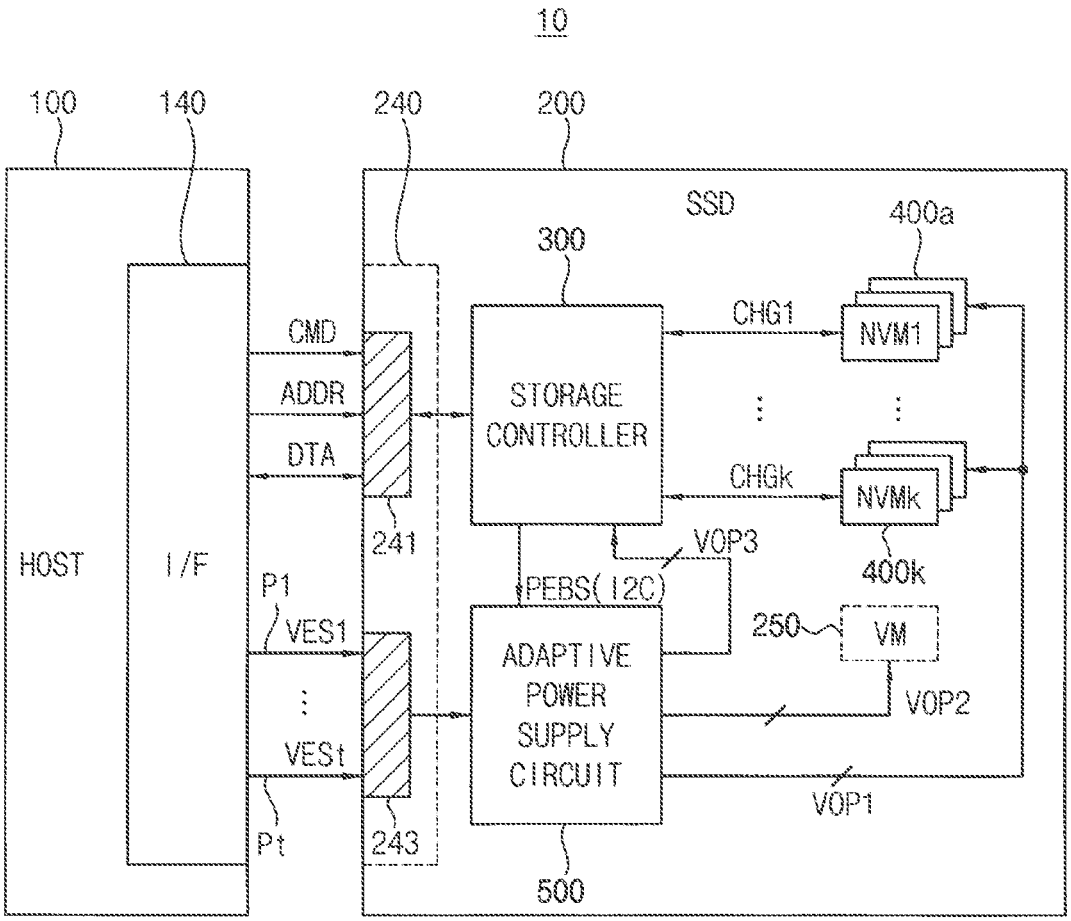
FIG. 1 is a block diagram illustrating a storage system according to an exemplary embodiment of the present inventive concept.

Exemplary embodiments of the present inventive concept will be described more fully hereinafter with reference to the accompanying drawings. Like reference numerals may refer to like elements throughout the accompanying drawings.

FIG. 1 is a block diagram illustrating a storage system according to an exemplary embodiment of the present inventive concept.

Referring to FIG. 1, in an exemplary embodiment, a storage system 10 includes a host 100 and a storage device 200. The host 100 includes a storage interface 140.

According to exemplary embodiments, including the exemplary embodiment described with reference to FIG. 1, the storage device 200 is a solid state drive (SSD) device. However, the storage device 200 is not limited thereto, and the storage device 200 may include various types of storage devices.

In an exemplary embodiment, the storage device 200 includes a storage controller 300, a plurality of nonvolatile memory devices 400a-400k (where k is an integer greater than two), an adaptive power supply circuit 500, and a host interface 240. The host interface 240 includes a signal connector 241 and a power connector 243. The storage device 200 further includes a volatile memory device 250.

The plurality of nonvolatile memory devices 400a-400k may be used as a storage medium of the storage device 200. In exemplary embodiments, each of the plurality of nonvolatile memory devices 400a-400k includes a flash memory or a vertical NAND memory device. The storage controller 300 may be coupled to the plurality of nonvolatile memory devices 400a-400k through a plurality of channels CHG1~CHGk, respectively.

The storage controller 300 is configured to receive a command signal CMD and an address signal ADDR from the host 100, and communicate data DTA with the host 100 through the signal connector 241. The storage controller 300 may write the data DTA to the plurality of nonvolatile memory devices 400a-400k or read the data DTA from plurality of nonvolatile memory devices 400a-400k based on the command signal CMD and the address signal ADDR.

The storage controller 300 may communicate the data DTA with the host 100 using the volatile memory device 250 as an input/output buffer. In exemplary embodiments, the volatile memory device 250 may include a dynamic random access memory (DRAM).

The adaptive power supply circuit 500 is configured to receive a plurality of power supply voltages (e.g., external supply voltages) VES1-VESt from the host 100 through the power connector 243. For example, the power connector 243 may include a plurality of power lines P1~Pt, and the adaptive power supply circuit 500 may be configured to receive the plurality of power supply voltages VES1~VESt from the host 100 through the plurality of power lines P1~Pt, respectively. Here, t represents an integer greater than one.

The adaptive power supply circuit 500 may generate at least one first operation voltage VOP1 used by the plurality of nonvolatile memory devices 400a-400k, at least one second operation voltage VOP2 used by the volatile memory device 250, and at least one third operation voltage VOP3 used by the storage controller 300 based on the plurality of power supply voltages VES1~VESt.

For example, when the adaptive power supply circuit 500 receives all of the plurality of power supply voltages VES1~VESt from the host 100, the adaptive power supply circuit 500 may generate the at least one first operation voltage VOP1, the at least one second operation voltage VOP2, and the at least one third operation voltage VOP3 using all of the plurality of power supply voltages VES1~VESt. Alternatively, when the adaptive power supply circuit 500 receives less than all of the plurality of power supply voltages VES1~VESt from the host 100, the adaptive power supply circuit 500 may generate the at least one first operation voltage VOP1, the at least one second operation voltage VOP2, and the at least one third operation voltage VOP3 using all of the portion of the plurality of power supply voltages VES1~VESt that are received from the host 100.

In an exemplary embodiment, the adaptive power supply circuit 500 selectively activates at least a power disable function based on a level of a third power supply voltage of the power supply voltages VES1~VESt, which is provided through a third power line P3 of the power lines P1-Pt, in response to a power disable function setting control signal PEBS received from the storage controller 300. The storage controller 300 may determine whether the host 100 and the storage device 200 support a power disable function by referring to a setting register set included therein, and may provide the power disable function setting control signal PEBS to the adaptive power supply circuit 500 based on the determination.

In an exemplary embodiment, under control of the storage controller 300, the adaptive power supply circuit 500 adaptively activates the power disable function according to the level of the third power supply voltage provide through the third power line P3. The adaptively activated power disable function is associated with a provision of the at least one first operation voltage VOP1 used by the plurality of nonvolatile memory devices 400a-400k (e.g., associated with the at least one first operation voltage VOP1 supplied to the plurality of nonvolatile memory devices 400a-400k to drive the nonvolatile memory devices 400a-400k).

Figure 2:
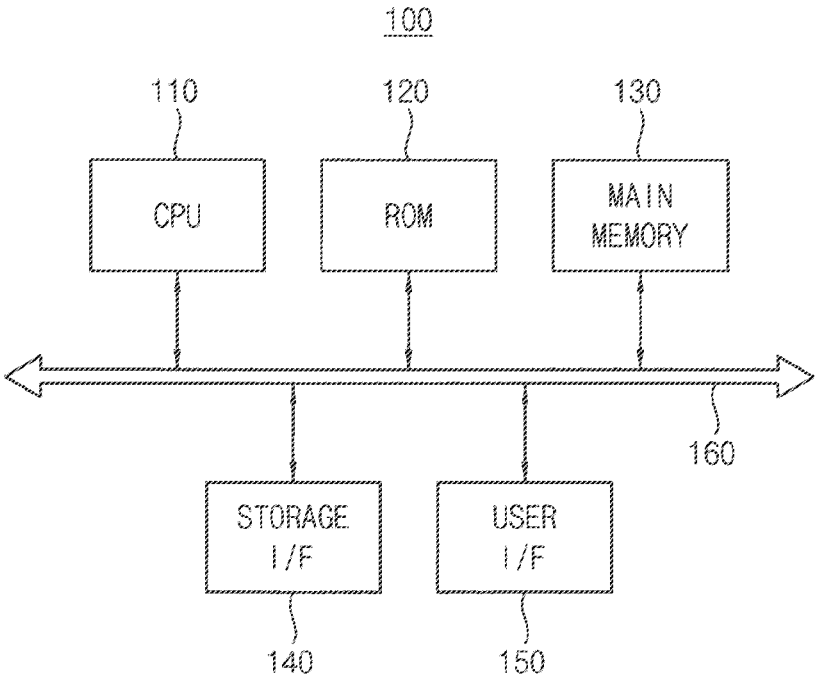
FIG. 2 is a block diagram illustrating the host in FIG. 1 according to an exemplary embodiment of the present inventive concept.

FIG. 2 is a block diagram illustrating the host in FIG. 1 according to an exemplary embodiment of the present inventive concept.

Referring to FIG. 2, in an exemplary embodiment, the host 100 includes a central processing unit (CPU) 110, a read-only memory (ROM) 120, a main memory 130, a storage interface 140, a user interface 150, and a bus 160.

The bus 160 may refer to a transmission channel via which data is transmitted between the CPU 110, the ROM 120, the main memory 130, the storage interface 140, and the user interface 150 of the host 100. The ROM 120 may store various application programs. For example, application programs supporting storage protocols such as Advanced Technology Attachment (ATA), Small Computer System Interface (SCSI), embedded Multi Media Card (eMMC), and/or Unix File System (UFS) protocols may be stored in the ROM 120.

The main memory 130 may temporarily store data or programs. The user interface 150 may be a physical or virtual medium for exchanging information between a user and the host device 100, a computer program, etc., and includes physical hardware and logical software. For example, the user interface 150 may include an input device for allowing the user to manipulate the host 100, and an output device for outputting a result of processing an input of the user.

The CPU 110 may control overall operations of the host 100. The CPU 110 may generate a command for storing data in the storage device 200 or a request (or a command) for reading data from the storage device 200 by using an application stored in the ROM 120, and may transmit the request to the storage device 200 via the storage interface 140.

Figure 3:
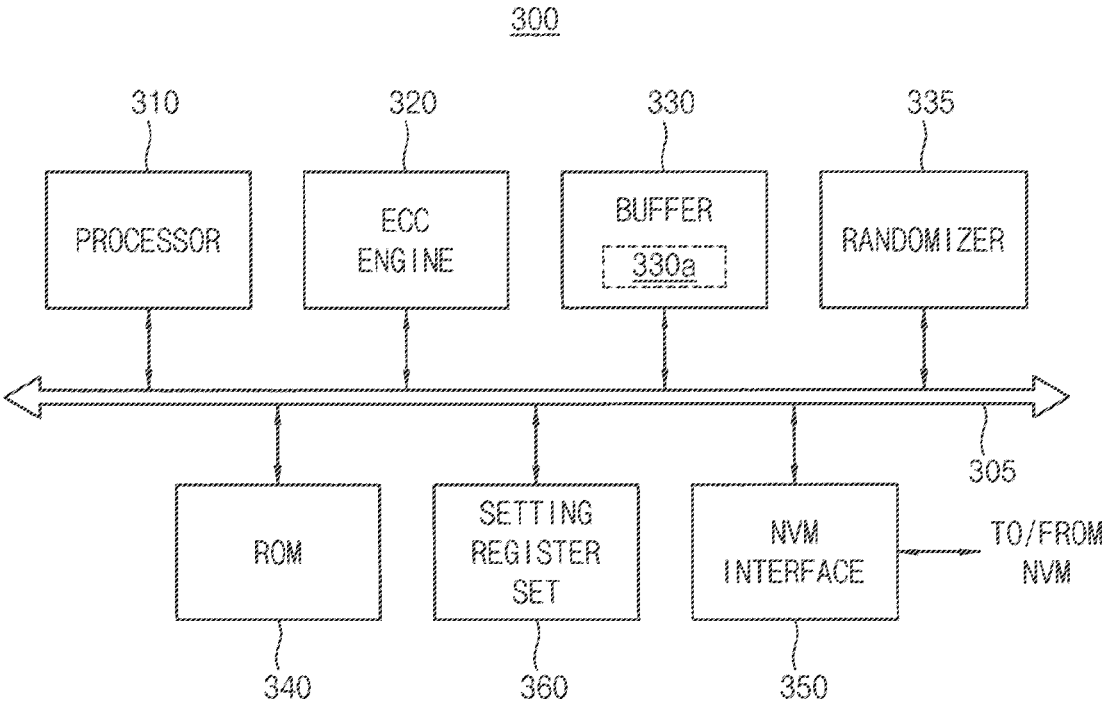
FIG. 3 is a block diagram illustrating an example of the storage controller in FIG. 1 according to an exemplary embodiment of the present inventive concept.

FIG. 3 is a block diagram illustrating an example of the storage controller in FIG. 1 according to an exemplary embodiment of the present inventive concept.

Referring to FIG. 3, in an exemplary embodiment, the storage controller 300 includes a processor 310, an error correction code (ECC) engine 320, a buffer 330, a firmware 330a, a randomizer 335, a ROM 340, a setting register set 360, and a nonvolatile memory interface 350, which are connected via a bus 305.

The processor 310 controls an overall operation of the memory controller 40.

Memory cells of the nonvolatile memory devices 400a-400k may have the physical characteristic that a threshold voltage distribution varies due to various causes such as, for example, a program elapsed time, a temperature, program disturbance, a read disturbance, etc. For example, data stored in the nonvolatile memory devices 400a-400k may become corrupt due to the above causes. The storage controller 300 may utilize a variety of error correction techniques to correct such errors. For example, the storage controller 300 may include the ECC engine 320, which performs error correction.

In an exemplary embodiment, the firmware 330a is driven by the processor 310, and checks setting bits stored in the setting register set 360 to determine whether the host 100 and the storage device 200 support the power disable function.

In an exemplary embodiment, the firmware 330a is stored in the ROM 340, is loaded in the buffer 330 and is driven by the processor 310, and determines whether the host 100 and the storage device 200 support the power disable function by checking the setting bits stored in the setting register set 360. The ROM 340 stores a variety of information needed for the storage controller 300 to operate in firmware. The buffer 330 may store data provided from the nonvolatile memory devices 400a-400k.

The randomizer 335 randomizes data to be stored in the nonvolatile memory devices 400a-400k. For example, the randomizer 335 may randomize data to be stored in the nonvolatile memory devices 400a-400k in a unit of a word line.

Data randomizing is performed to process data such that program states of memory cells connected to a word line have the same ratio. For example, if memory cells connected to one word line are multi-level cells (MLC) each storing 2-bit data, each of the memory cells has one of an erase state and first through third program states. In this case, the randomizer 335 randomizes data such that in memory cells connected to one word line, the number of memory cells having the erase state, the number of memory cells having the first program state, the number of memory cells having the second program state, and the number of memory cells having the third program state are substantially the same as one another. For example, memory cells in which randomized data is stored have program states of which the number is equal to one another.

The randomizer 335 de-randomizes data read from the nonvolatile memory devices 200a-200k.

In an exemplary embodiment, the setting register set 360 stores the setting bits that indicate whether the host 100 and the storage device 200 support the power disable function. The storage controller 300 communicates with the nonvolatile memory devices 400a-400k through the nonvolatile memory interface 350.

Figure 4:
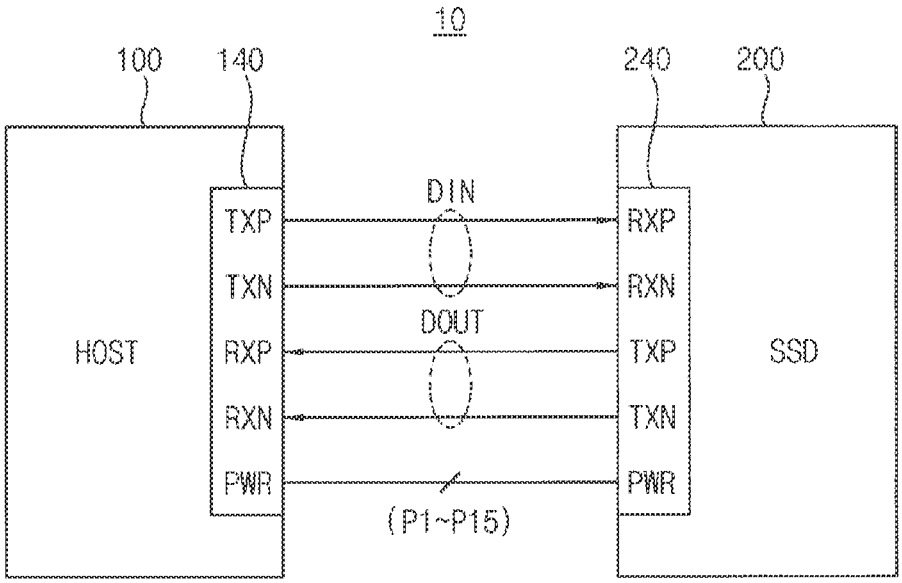
FIG. 4 is a block diagram further illustrating an example of an interface for the storage system of FIG. 1 according to an exemplary embodiment of the present inventive concept.

FIG. 4 is a block diagram further illustrating an example of an interface for the storage system of FIG. 1 according to an exemplary embodiment of the present inventive concept.

In FIG. 4, a SATA interface is used as an example. However, exemplary embodiments are not limited thereto.

The storage interface 140 and the host interface 240 may be connected via a SATA cable including a data segment and a power segment.

The data segment (e.g., the signal connector 241) is assumed to include two unidirectional data line pairs, DIN and DOUT. DIN is used to provide data from the host 100 to the storage device 200. DOUT is used to provide data from the storage device 200 to the host 100. The data lines implementing DIN and DOUT may be connected between respective transmission (TX) terminals and receiving (RX) terminals (e.g., TXP, TXN, RXP, and RXN terminals) of the host 100 and storage device 200. The data segment may be also be referred to as a signal segment.

The power segment (e.g., the power connector 243) includes fifteen power lines (e.g., P1 to P15). The power segment may be connected to various power terminals (PWR) of the host 100 and storage device 200, and may be respectively used to communicate various voltages such as, for example, 3.3V, 5V and 12V.

FIG. 5 is a table illustrating an example of the power lines in FIG. 4 according to an exemplary embodiment of the present inventive concept.

Referring to FIG. 5, the use of a particular power cable compatible with a SATA interface is assumed. The power cable includes fifteen power lines capable of respectively providing power signals, control signals, and other forms of non-signals.

Thus, the power lines P1, P2, P4~P10, P12, P13, P14 and P15 are designated to supply various DC power signals (e.g., 3.3V, 5.0V, 12.0V, and ground). In contrast, the power lines P3 and P11 are designated to respectively supply certain non-signals.

A non-signal may be used, for example, to manage the power status of the host 100 and/or the storage device 200. A non-signal may be, for example, a particular type of data signal or control signal that is communicated outside of the data segment of the SATA interface. A non-signal may also be referred to as a side signal.

For example, the power line P3 may supply a non-signal associated with a power disable function PWDIS FUNCTION. The power line P3 may further supply a non-signal associated with a device sleep function DEVSLP FUNCTION. The power line P1 may supply a "device activity signal" or a "staggered spin-up signal."

The device activity signal may be activated during periods in which data is being communicated from the storage interface 140 to the host interface 240. Alternatively, when a number of host interfaces 240 are connected to the storage interface 140, and the storage device 200 is a hard disk drive (HDD), the "staggered spin-up signal" may serve as a spin-up signal indicating a spinning up of storage devices on a stage-by-stage basis. Thus, the staggered spin-up signal may be activated upon power-up of the storage device 200.

The device sleep DEVSLP signal is a non-signal enabling the storage interface 140 and the host interface 240 to operate in a low power operating mode. The power disable signal PWDIS is a non-signal that allows the storage device 200 to enter into a power-off mode by cutting off a power (e.g., by turning off/disabling a power) supplied to the storage device 200.

Figure 6A:
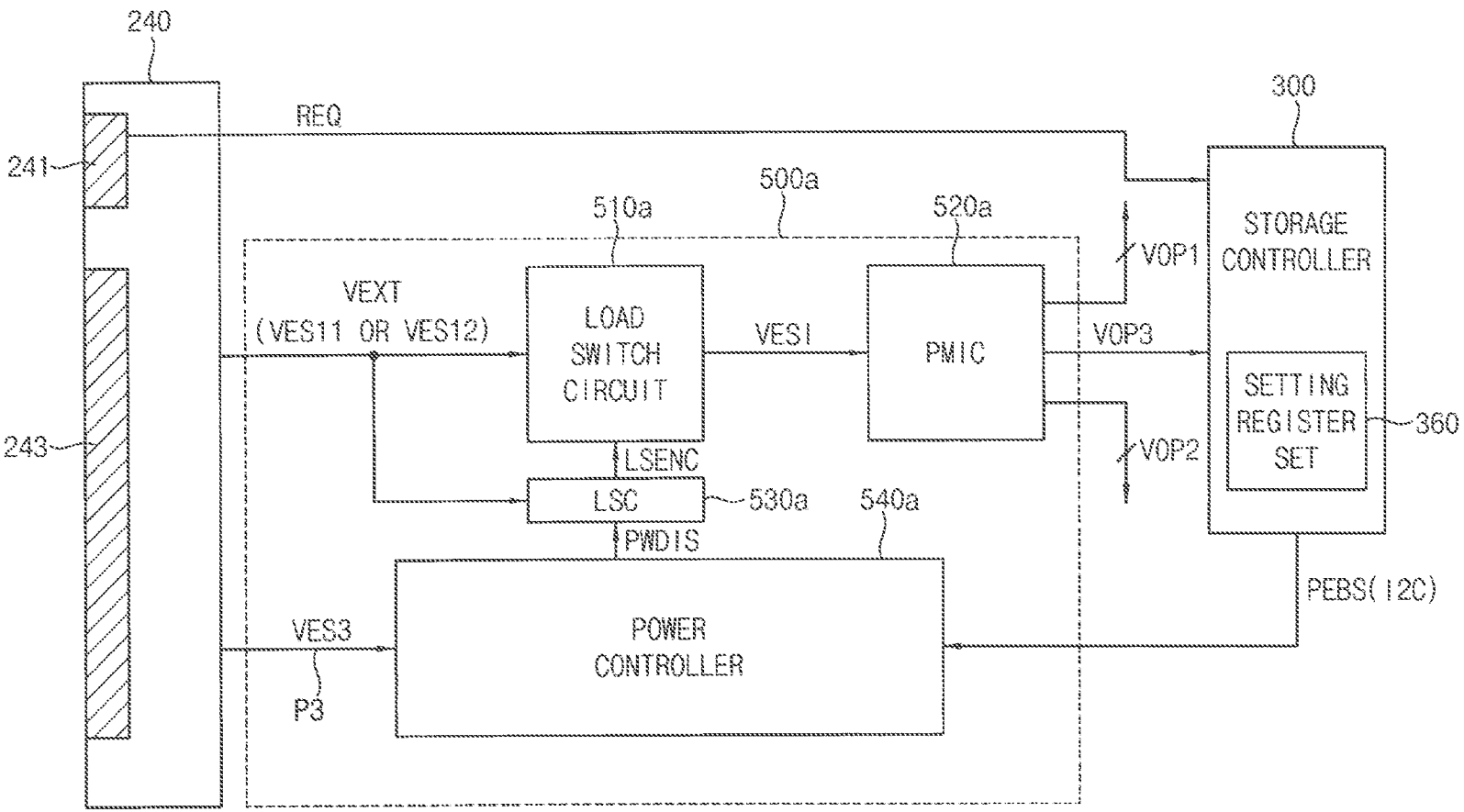
FIG. 6A is a block diagram illustrating an example of the adaptive power supply circuit in FIG. 1 according to an exemplary embodiment of the present inventive concept.

FIG. 6A is a block diagram illustrating an example of the adaptive power supply circuit in FIG. 1 according to an exemplary embodiment of the present inventive concept.

In FIG. 6A, the host interface 240 and the storage controller 300 are illustrated together for convenience of explanation. The storage controller 300 includes the setting register set 360.

Referring to FIG. 6A, in an exemplary embodiment, an adaptive power supply circuit 500a includes a load switch circuit 510a, a power management integrated circuit (PMIC) 520a, a load switch controller 530a, and a power controller 540a. The power controller 540a may be implemented with hardware or software.

The load switch circuit 510a may selectively switch a first power supply voltage VES11 (e.g., 12V) and a second power supply voltage VES12 (e.g., 5V) in response to a switch enable control signal LSENC to provide a switching power supply voltage VESI to the PMIC 520a. The first power supply voltage VES11 is supplied through a power line P14 or P15, and the second power supply voltage VES12 is supplied through a power line P8 or P9. The first power supply voltage VES11 or the second power supply voltage VES12 may be referred to as an external power voltage VEXT or as at least one power supply voltage.

The PMIC 520a receives the switching power supply voltage VESI and generates the operation voltages VOP1, VOP2 and VOP3 based on the switching power supply voltage VES1. The operation voltages VOP1, VOP2 and VOP3 may be referred to as at least one operation voltage.

The power controller 540a may selectively activate a power disable signal PWDIS in response to the power disable function setting control signal PEBS and a level of a third power supply voltage VES3 provided through a third power line P3. The storage controller 300 may provide the power disable function setting control signal PEBS to the power controller 540a through a serial interface such as, for example, an inter-integrated circuit ($I^2C$) interface.

Figure 6B:
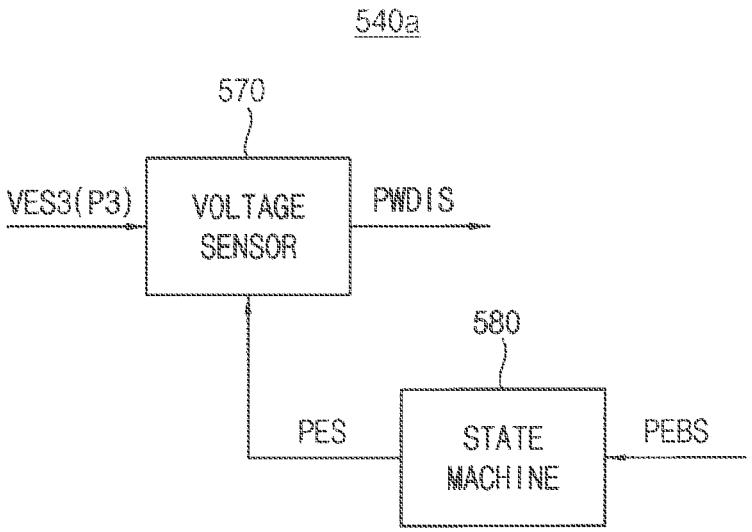
FIG. 6B illustrates an example of the power controller in FIG. 6A according to an exemplary embodiment of the present inventive concept.

FIG. 6B illustrates an example of the power controller in FIG. 6A according to an exemplary embodiment of the present inventive concept.

Referring to FIG. 6B, in an exemplary embodiment, a power controller 540a includes a voltage sensor 570 and a state machine 580.

According to exemplary embodiments of the present inventive concept, a state machine, as described herein, may be implemented using, for example, a programmable logic device, a programmable logic controller, logic gates, flip-flops, etc. In additions, state machines, as described herein, may also be referred to as state machine circuits.

The state machine 580 may selectively activate a first setting control signal PES in response to the power disable function setting control signal PEBS, and may provide the first setting control signal PES to the voltage sensor 570. The voltage sensor 570 is selectively activated in response to the first setting control signal PES, detects the level of the third power supply voltage VES3, and selectively activates the power disable signal PWDIS based on the detected level.

The state machine 580 may deactivate the first setting control signal PES with a logic low level by default. When the voltage sensor 570 is deactivated in response to the first setting control signal PES, the voltage sensor 570 does not output the power disable signal PWDIS based on the detected level of the third power supply voltage VES3. When the storage controller 300 changes a logic level of the power disable function setting control signal PEBS, the state machine 530 activates the first setting control signal PES with a logic high level, and the voltage sensor 570 outputs the power disable signal PWDIS based on the detected level of the third power supply voltage VES3.

Herein, exemplary embodiments of the present inventive concept are described in which signals have a logic low level by default. However, exemplary embodiments of the present inventive concept are not limited thereto. For example, in exemplary embodiments, signals described herein as having a logic low level by default may instead have a logic high level by default.

Figure 6C:
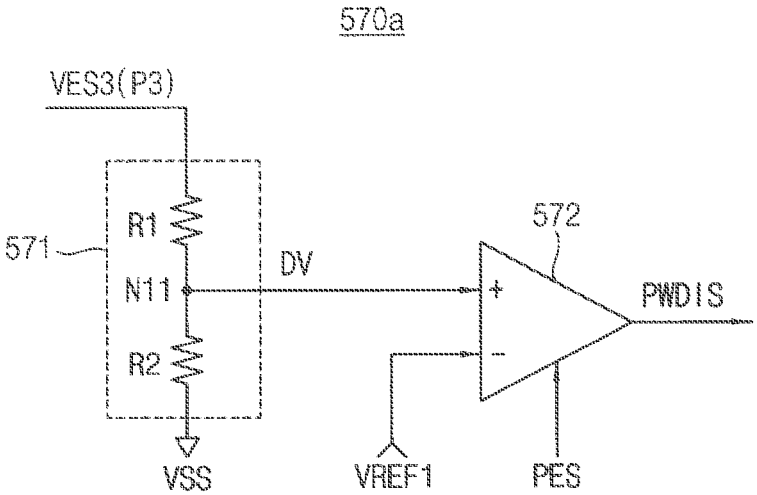
FIG. 6C illustrates an example of the voltage sensor in the power controller of FIG. 6B according to an exemplary embodiment of the present inventive concept.

FIG. 6C illustrates an example of the voltage sensor in the power controller of FIG. 6B according to an exemplary embodiment of the present inventive concept.

Referring to FIG. 6C, in an exemplary embodiment, a voltage sensor 570a includes a voltage detector 571 and a comparator 572. The voltage detector 571 includes a first resistor R1 and a second resistor R2. The first resistor R1 and the second resistor R2 are connected in series between the third power line P3 and a ground voltage VSS. The voltage detector 571 provides a detected voltage DV at a first node N11 at which the first resistor R1 and the second resistor R2 are connected to each other. The comparator 572 is activated in response to the first setting control signal PES and outputs the power disable signal PWDIS according to a result of a comparison of the detected voltage DV and a first reference voltage VREF1.

Figure 6D:
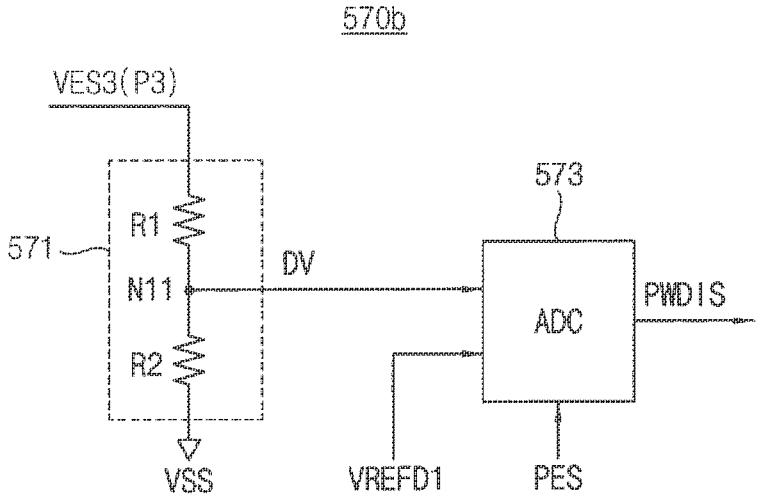
FIG. 6D illustrates an example of the voltage sensor in the power controller of FIG. 6B according to an exemplary embodiment of the present inventive concept.

FIG. 6D illustrates an example of the voltage sensor in the power controller of FIG. 6B according to an exemplary embodiment of the present inventive concept.

Referring to FIG. 6D, in an exemplary embodiment, the voltage sensor 570b includes a voltage detector 571 and an analog-to-digital (ADC) converter 573. The voltage detector 571 includes a first resistor R1 and a second resistor R2. The first resistor R1 and the second resistor R2 are connected in series between the third power line P3 and a ground voltage VSS. The voltage detector 571 provides a detected voltage DV at a first node N11. The ADC converter 573 is activated in response to the first setting control signal PES, converts the detected voltage DV to a corresponding digital value, and outputs the power disable signal PWDIS according to a result of a comparison of the converted digital value and a first reference digital value VREFD1 corresponding to the first reference voltage VREF1.

Figure 6E:
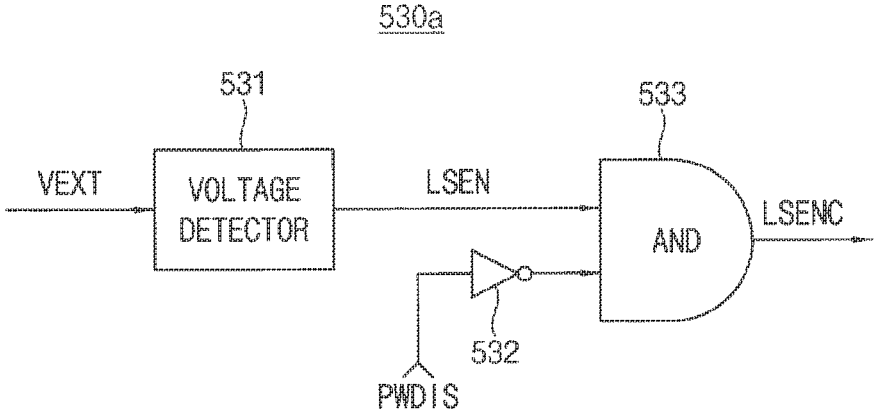
FIG. 6E is a block diagram illustrating the load switch controller in FIG. 6A according to an exemplary embodiment of the present inventive concept.

FIG. 6E is a block diagram illustrating the load switch controller in FIG. 6A according to an exemplary embodiment of the present inventive concept.

Referring to FIG. 6E, in an exemplary embodiment, the load switch controller 530a includes a voltage detector 531, an inverter 532, and an AND gate 533.

The voltage detector 531 detects a level of the external power voltage VEXT, and outputs a switch enable signal LSEN according to a level of the detected external power voltage VEXT. The voltage detector 531 may activate the switch enable signal LSEN when the level of the external power voltage VEXT reaches about 80% of a target level. The inverter 532 inverts a logic level of the power disable signal PWDIS. The AND gate 533 performs an AND operation on the switch enable signal LSEN and an output of the inverter 532 to output a switch enable control signal LSENC. Therefore, when the switch enable signal LSEN has a high level and the power disable signal PWDIS has a low level, the switch enable control signal LSENC is activated, the load switch circuit 510a is activated in response to the switch enable control signal LSENC, and the activated load switch circuit 510a switches the external power voltage VEXT to provide the switching power supply voltage VESI to the PMIC 520a.

FIG. 6F is a table illustrating levels of various signals in FIGS. 6A through 6E according to an exemplary embodiment of the present inventive concept.

Referring to FIGS. 6A through 6F, when the power disable function setting control signal PEBS designates deactivation of the power disable function, the power disable signal PWDIS is deactivated (e.g., disabled) regardless of the level of the third power supply voltage VES3, and thus, the switch enable signal LSEN and the switch enable control signal LSENC are activated with a high level. In addition, when the power disable function setting control signal PEBS designates activation of the power disable function, the power disable signal PWDIS is selectively activated (e.g., enabled) according to the level of the third power supply voltage VES3, the switch enable control signal LSENC is deactivated, and the load switch circuit 510a cuts off the provision of the external power voltage VEXT to the PMIC 520a.

Figure 6G:
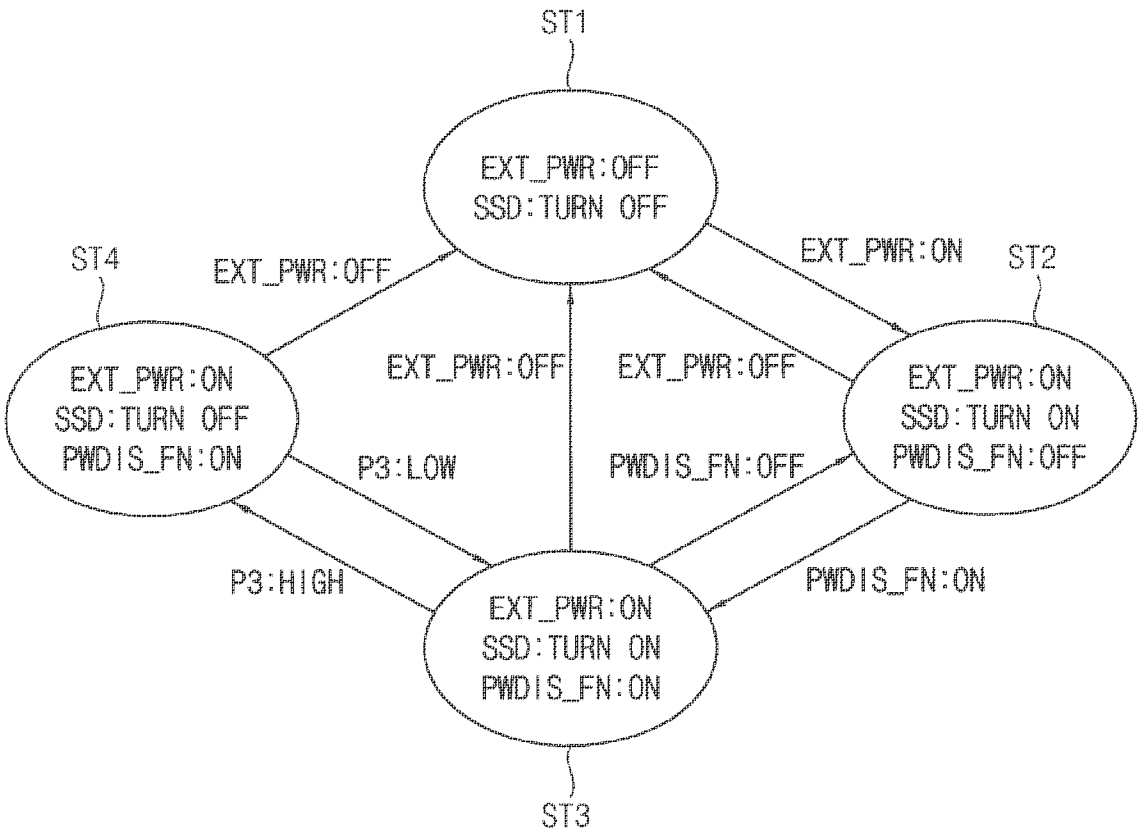
FIG. 6G is a diagram illustrating power states of the storage device in FIG. 1 according to an exemplary embodiment of the present inventive concept.

FIG. 6G is a diagram illustrating power states of the storage device in FIG. 1 according to an exemplary embodiment of the present inventive concept.

Referring to FIG. 6G, it is assumed that the adaptive power supply circuit 500 in the storage device 200 in FIG. 1 is implemented with the adaptive power supply circuit 500a in FIG. 6A.

Referring to FIGS. 1 and 6A through 6G, power states of the storage device 200 include first through fourth states ST1, ST2, ST3 and ST4.

The first state ST1 denotes a state in which the storage device 200 is turned off when an external power EXT_PWR is not supplied to the storage device 200. The second state ST2 denotes a state in which the external power EXT_PWR is supplied to the storage device 200, the storage device 200 is turned on and the power disable function is deactivated. In the second state ST2, the level of the third power supply voltage VEXT3 is not of an interest.

The third state ST3 denotes a state in which the external power EXT_PWR is supplied to the storage device 200, the storage device 200 is turned on, and the power disable function is activated. The fourth state ST4 denotes a state in which the external power EXT_PWR is supplied to the storage device 200, the storage device 200 is turned off, and the power disable function is activated.

When the external power EXT_PWR is supplied to the storage device 200 in the first state ST1, the first state ST1 transitions to the second state ST2. When the external power EXT_PWR is cut off (e.g., disabled) in the second state ST2, the second state ST2 transitions to the first state ST1. When the power disable function is activated in the second state ST2, the second state ST2 transitions to the third state ST3. When the power disable function is deactivated in the third state ST3, the third state ST3 transitions to the second state ST2. When the external power EXT_PWR is cut off in the third state ST3, the third state ST3 transitions to the first state ST1. When the level of the third power supply voltage VES3 is greater than a level of the first reference voltage VREF1, the third state ST3 transitions to the fourth state ST4. When the external power EXT_PWR is cut off in the fourth state ST4, the fourth state ST4 transitions to the first state ST1. When the level of the third power supply voltage VES3 is smaller than the level of the first reference voltage VREF1, the fourth state ST4 transitions to the third state ST3.

Accordingly, in the storage device 200 according to an exemplary embodiment, the storage controller 300 sets the power disable function of the power controller 540a through a serial interface, and deactivates the power disable function when the storage device 200 is connected to a server that does not support the power disable function. Therefore, the storage device 200 may increase compatibility with legacy servers.

Figure 7A:
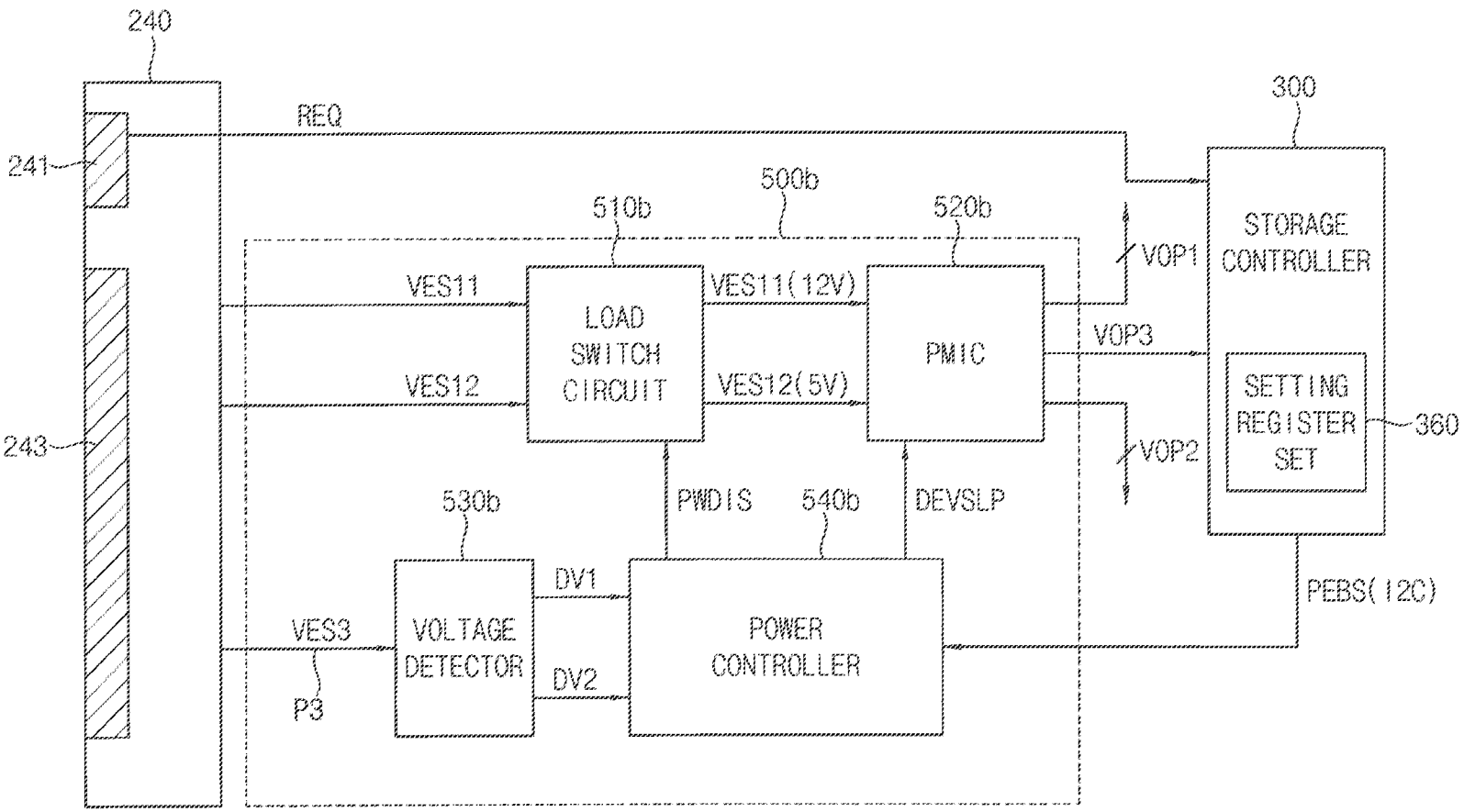
FIG. 7A is a block diagram illustrating an example of the adaptive power supply circuit in FIG. 1 according to an exemplary embodiment of the present inventive concept.

FIG. 7A is a block diagram illustrating an example of the adaptive power supply circuit in FIG. 1 according to an exemplary embodiment of the present inventive concept.

In FIG. 7A, the host interface 240 and the storage controller 300 are illustrated together for convenience of explanation. The storage controller 300 includes the setting register set 360.

Referring to FIG. 7A, in an exemplary embodiment, an adaptive power supply circuit 500b includes a load switch circuit 510b, a PMIC 520b, a voltage detector 530b, and a power controller 540b. The power controller 540a may be implemented with a programmable logic device. The power controller 540b may be implemented with hardware or software.

The load switch circuit 510b may selectively switch a first power supply voltage VES11 (e.g., 12V) and a second power supply voltage VES12 (e.g., 5V) in response to the power disable signal PWDIS to provide the first power supply voltage VES11 and the second power supply voltage VES12 to the PMIC 520b. The first power supply voltage VES11 is supplied through the power line P14 or P15, and the second power supply voltage VES12 is supplied through the power line P8 or P9.

The PMIC 520b receives the first power supply voltage VES11 and the second power supply voltage VES12, and generates the operation voltages VOP1, VOP2 and VOP3 by using the first power supply voltage VES11 and the second power supply voltage VES12 in response to the device sleep signal DEVSLP.

The voltage detector 530b detects the level of the third power supply voltage VES3 provided through the third power line P3 to provide a first detected voltage DV1 and a second detected voltage DV2.

The power controller 540b selectively activates the power disable signal PWDIS and the device sleep signal DEVSLP according to a level of the first detected voltage DV1 and a level of the second detected voltage DV2 in response to the power disable function setting control signal PEBS provided from the storage controller 300.

The setting register set 360 is checked to determine whether both the host 100 and the storage device 200 support the power disable function. When both the host 100 and the storage device 200 support the power disable function, the storage controller 300 activates the power disable function setting control signal PEBS. The storage controller 300 provides the power disable function setting control signal PEBS to the power controller 540b through a side-band serial interface such as, for example, an $I^2C$ interface.

The adaptive power supply circuit 500b may generate the first operation voltage VOP1 and the second operation voltage VOP2 based on the first power supply voltage VES11 and the second power supply voltage VES12 provided through a portion of the plurality of power lines P1~Pt, and may adaptively activate the power disable function and the device sleep function according to the level of the third power supply voltage VES3 provided through the third power line P3 and according to a setting of the storage controller 300. The setting of the storage controller 300 may be determined based on whether the host 100 and the storage device 200 support the power disable function.

Figure 7B:
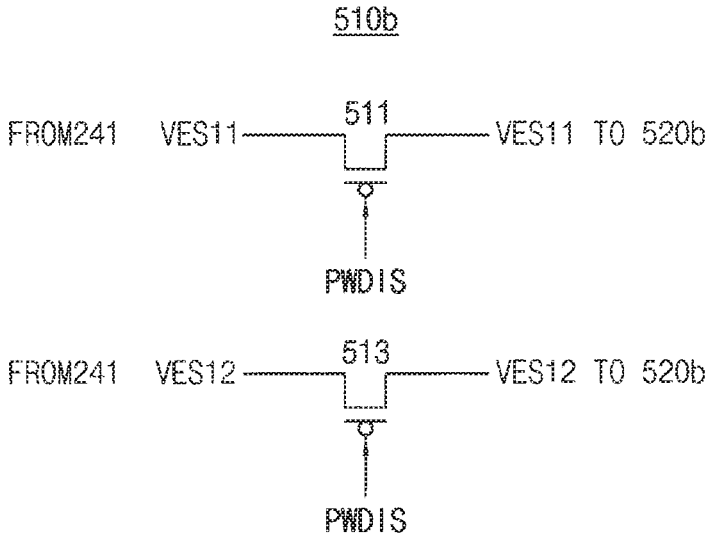
FIG. 7B illustrates an example of the load switch circuit in the adaptive power supply circuit in FIG. 7A according to an exemplary embodiment of the present inventive concept.

FIG. 7B illustrates an example of the load switch circuit in the adaptive power supply circuit in FIG. 7A according to an exemplary embodiment of the present inventive concept.

Referring to FIG. 7B, in an exemplary embodiment, the load switch circuit 510b includes p-channel metal-oxide semiconductor (PMOS) transistors 511 and 513. The PMOS transistor 511 switches the first power supply voltage VES11 to the PMIC 520b in response to the power disable signal PWDIS. The PMOS transistor 513 switches the second power supply voltage VES12 to the PMIC 520b in response to the power disable signal PWDIS. When the power disable signal PWDIS is activated with a high level, the provision of the first power supply voltage VES11 and the second power supply voltage VES12 to the PMIC 520b is cut off.

Figure 8:
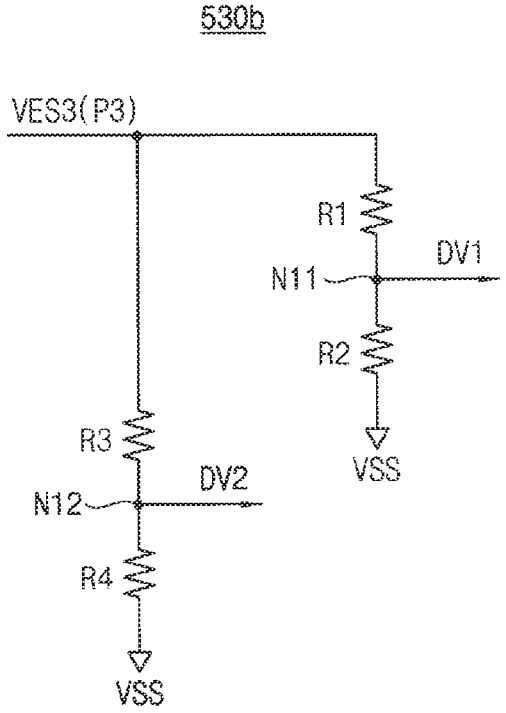
FIG. 8 illustrates an example of the voltage detector in the adaptive power supply circuit in FIG. 7A according to an exemplary embodiment of the present inventive concept.

FIG. 8 illustrates an example of the voltage detector in the adaptive power supply circuit in FIG. 7A according to an exemplary embodiment of the present inventive concept.

Referring to FIG. 8, in an exemplary embodiment, the voltage detector 530b includes first through fourth resistors R1~R4.

The first resistor R1 and the second resistor R2 are connected in series between the third power line P3 and the ground voltage VSS, and the third resistor R3 and the fourth resistor R4 are connected in series between the third power line P3 and a ground voltage VSS in parallel with the first resistor R1 and the second resistor R2. The voltage detector 530b provides the first detected voltage DV1 at a first node N11 at which the first resistor R1 and the second resistor R2 are connected to each other, and provides the second detected voltage DV2 at a second node N12 at which the third resistor R3 and the fourth resistor R4 are connected to each other.

Figure 9:
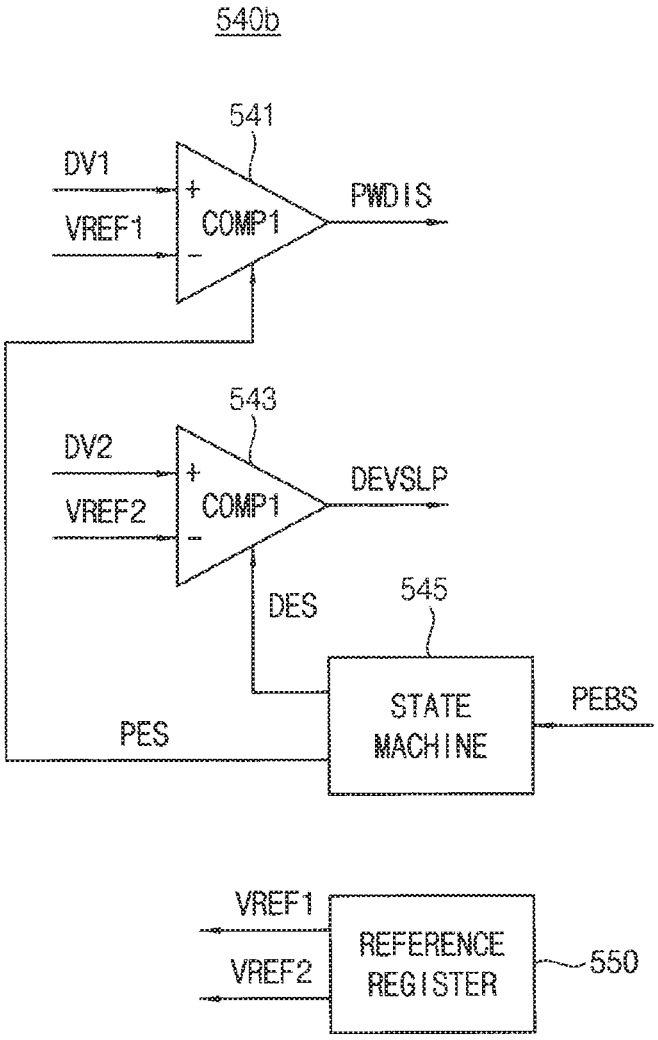
FIG. 9 illustrates an example of the power controller in the adaptive power supply circuit in FIG. 7A according to an exemplary embodiment of the present inventive concept.

FIG. 9 illustrates an example of the power controller in the adaptive power supply circuit in FIG. 7A according to an exemplary embodiment of the present inventive concept.

Referring to FIG. 9, in an exemplary embodiment, the power controller 540b includes a first comparator 541, a second comparator 543, a state machine 545, and a reference register 550.

The state machine 545 may activate a first setting control signal PES and a second setting control signal DES when the power disable function setting control signal PEBS is activated with a high level. The first comparator 541 is activated in response to the first setting control signal PES, and outputs the power disable signal PWDIS according to a result of a comparison of the first detected voltage DV1 and a first reference voltage VREF1. The second comparator 543 is activated in response to the second setting control signal DES, and outputs the device sleep signal DEVSLP according to a result of a comparison of the second detected voltage DV2 and a second reference voltage VREF2.

The reference register 550 stores the first reference voltage VREF1 and the second reference voltage VREF2. Therefore, the device sleep signal DEVSLP is activated when the second detected voltage DV2 is greater than the second reference voltage VREF2, and the power disable signal PWDIS is activated when the first detected voltage DV1 is greater than the first reference voltage VREF1. When the power disable signal PWDIS is activated, the device sleep signal DEVSLP may be ignored.

Figure 10:
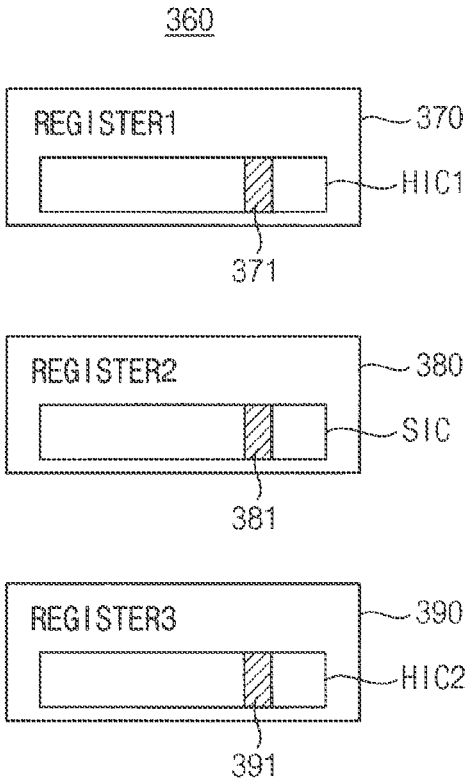
FIG. 10 illustrates the setting register set in the storage controller in FIG. 7A according to an exemplary embodiment of the present inventive concept.

FIG. 10 illustrates the setting register set in the storage controller in FIG. 7A according to an exemplary embodiment of the present inventive concept.

Referring to FIG. 10, in an exemplary embodiment, the setting register set 360 includes a first register 370, a second register 380, and a third register 390.

The first register 370 includes a first host information section HIC1 associated with a specification and information on the host 100. The first host information section HIC1 stores a first setting bit 371 indicating whether the host 100 always supports the power disable function.

The second register 380 includes a storage device information section SIC associated with a specification and information on the storage device 200. The storage device information section SIC stores a second setting bit 381 indicating whether the storage device 200 supports the power disable function.

The third register 390 includes a second host information section HIC2 associated with a specification and information on the host 100. The second host information section HIC2 stores a third setting bit 391 indicating whether the host 100 supports the power disable function (e.g., indicating whether the host 100 currently supports the power disable function).

Figure 11A:
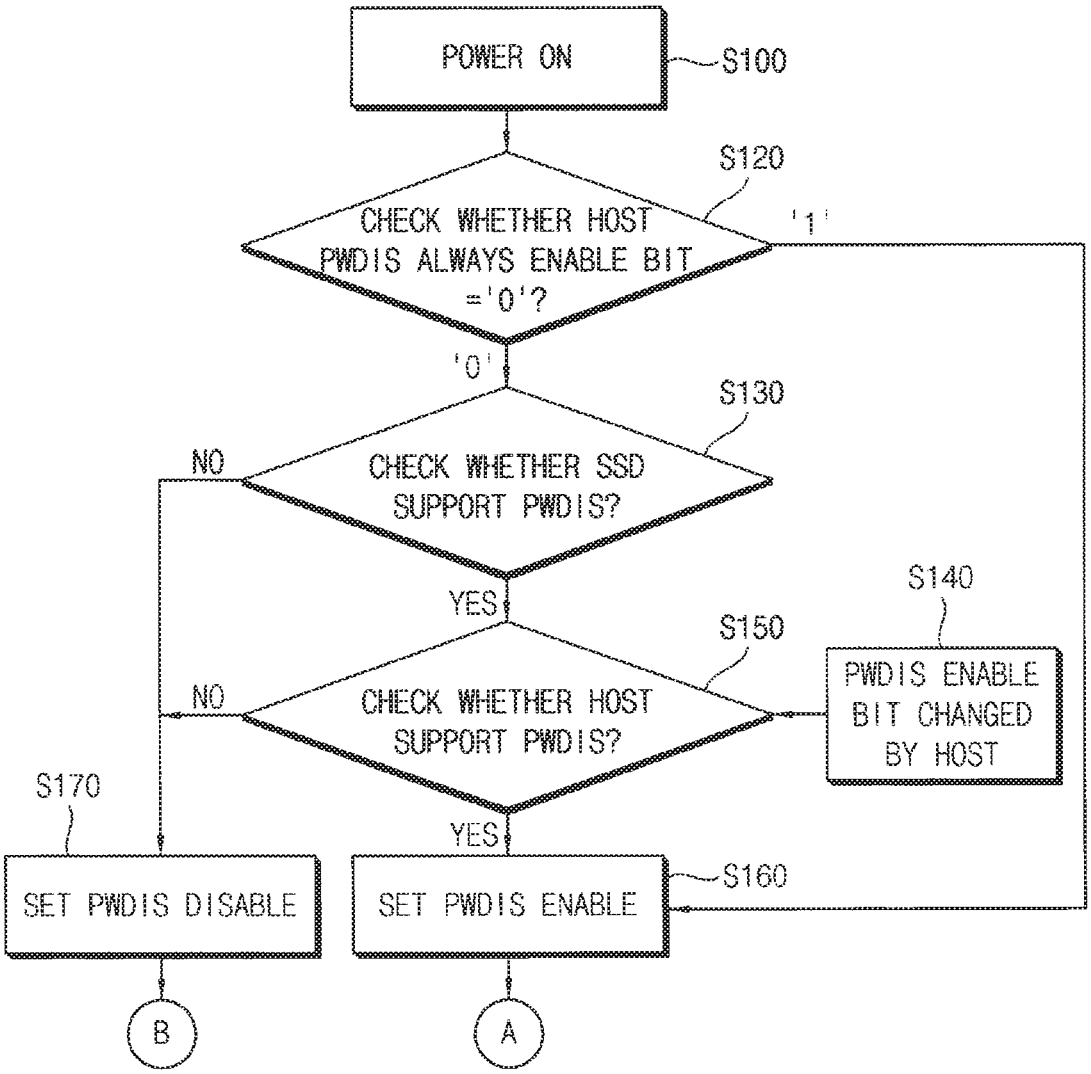
FIGS. 11A and 11B are flowcharts illustrating a method of operating a storage device according to an exemplary embodiment of the present inventive concept.
Figure 11B:
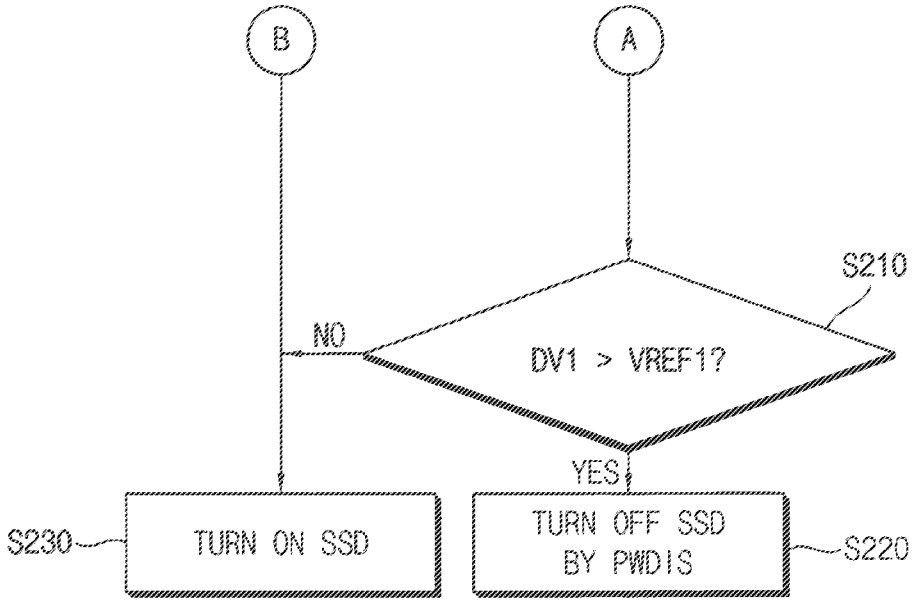

FIGS. 11A and 11B are flowcharts illustrating a method of operating a storage device according to an exemplary embodiment of the present inventive concept.

Referring to FIGS. 1 through 5 and 7A through 11B, when power is applied to the storage device (S100), the storage controller 300 (more particularly, the processor 310) determines whether the host 100 always supports the power disable function by checking the first setting bit 371 in the first register 370 of the setting register set 360 (S120). That is, the processor 310 checks whether the first setting bit 371 is a low level.

In an exemplary embodiment, the first setting bit 371 is set to a low level by default, and is set to a high level when the host 100 always supports the power disable function. When the first setting bit 371 is a low level in operation S120, the processor 310 determines whether the storage device 200 (e.g., the SSD) supports the power disable function by checking the second setting bit 381 (S130).

When the storage device 200 supports the power disable function (YES in S130), the processor 310 determines whether the host 100 supports the power disable function by checking the third setting bit 391 (S150). The logic level of the third setting bit 391 may be changed by a request of the host 100 (S140).

When the host 100 always supports the power disable function ('1' in S120) or the host 100 supports the power disable function (YES in S150), the processor 310 activates the power disable function setting control signal PEBS with a high level to provide the power disable function setting control signal PEBS to the state machine 545 in the power controller 540b (S160), and the state machine 545 activates the first setting control signal PES and the second setting control signal DES.

When the storage device 200 does not support the power disable function (NO in S130) or the host 100 does not support the power disable function (NO in S150), the processor 310 deactivates the power disable function setting control signal PEBS with a low level to provide the power disable function setting control signal PEBS to the state machine 545 in the power controller 540b (S170), and the state machine 545 deactivates the first setting control signal PES and the second setting control signal DES.

When the first setting control signal PES and the second setting control signal DES are activated, the power controller 540b determines whether the first detected voltage DV1 provided from the voltage detector 530b is greater than the first reference voltage VREF1 (S210). When the first detected voltage DV1 is greater than the first reference voltage VREF1 (YES in S210), the power controller 540b activates the power disable signal PWDIS, and the load switch circuit 510b turns off by cutting off the provision of the first power supply voltage VES11 and the second power supply voltage VES12 (S220).

When the first detected voltage DV1 is smaller than or equal to the first reference voltage VREF1 (NO in S210), the power controller 540b deactivates the power disable signal PWDIS, and the load switch circuit 510b provides the first power supply voltage VES11 and the second power supply voltage VES12 to the PMIC 520b to turn on the storage device 200 (S230).

When the second detected voltage DV2 is greater than the second reference voltage VREF2, the power controller 540b activates the device sleep signal DEVSLP and the storage device 200 operates in a low power mode.

According to exemplary embodiments, FIG. 11A illustrates the operation of the storage controller 300, and FIG. 11B illustrates the operation of the power controller 540b.

According to exemplary embodiments, the storage device 200 is compatible with a legacy server by selectively activating the power disable function setting control signal PEBS based on whether the host 100 and the storage device 200 support the power disable function. The storage device 200 provides improved performance by providing the power disable function and the device sleep function simultaneously.

According to the SATA 3.3 specification, the power disable function is provided through the third power line P3, and a conventional host or server always provides 3.3V through the third power line P3. As a result, when a storage device according to the SATA 3.3 specification is connected to such a conventional host or server, the power may be cut off. However, exemplary embodiments of the inventive concept may prevent this situation from occurring.

Figure 12:
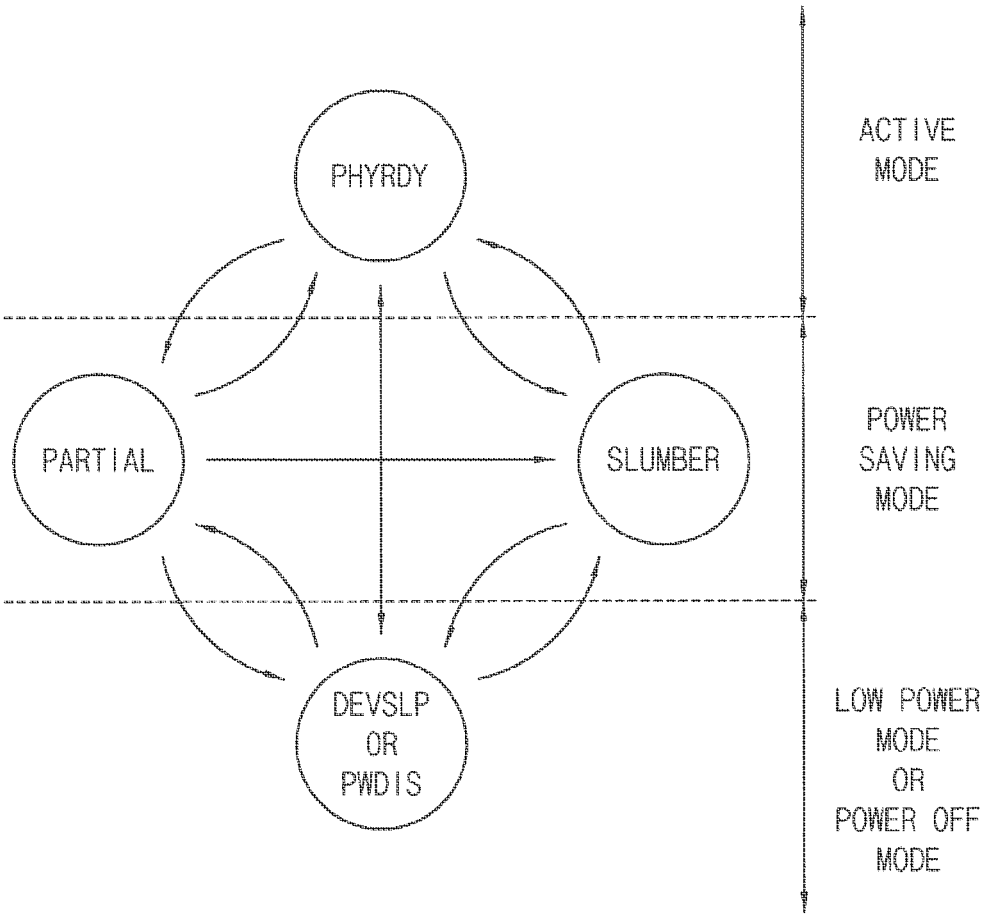
FIG. 12 is a diagram illustrating power states for managing power consumption of the SATA storage system of FIG. 1 according to an exemplary embodiment of the present inventive concept.

FIG. 12 is a diagram illustrating power states for managing power consumption of the SATA storage system of FIG. 1 according to an exemplary embodiment of the present inventive concept.

Referring to FIG. 12, in an exemplary embodiment, the SATA storage system 10 has a physical layer ready state (hereinafter referred as to a PHYRDY state) for operating in an active mode, a partial state and a slumber state for operating in a power saving mode, a device sleep state for operating in a deep power saving mode, and a power disable state for cutting off power.

The PHYRDY state may indicate that all PHY blocks of a physical layer are activated. The partial and slumber states may indicate a power saving state in which the SATA interface does not operate substantially. For example, in an exemplary embodiment, in the partial and slumber states, power is not supplied to some PHY blocks of the physical layer.

The partial state and the slumber state may be differentiated according to a wake-up time taken to return to a PHYRDY state from a corresponding mode. In an exemplary embodiment, power is not supplied to PHY blocks associated with data transmitting and receiving at the partial state, and power is not supplied to all PHY blocks other than a squelch circuit at the slumber state. For example, a wake-up time of the partial state may be faster than that of the slumber state, and power consumption of the partial state may be less than that of the partial state.

Data transmission and reception between the host 100 and the storage device 200 is halted at the device sleep state. In an exemplary embodiment, the storage device 200 supplies power only to a block to receive the device sleep signal DEVSLP of blocks in the host interface 240. When the storage device 200 is in the device sleep state, the host 100 does not provide the power to the storage interface 140. In the power disable state, the power supplied to the storage device 200 is cut off.

Referring to FIG. 12, the partial state and the slumber state may be entered into from the PHYRDY state. Further, the deep slumber state may be entered into from the partial state and the slumber state. The deep slumber state may be a state which the SATA interface enters at a power saving mode, which means that power can be saved more in the deep slumber state. In addition, the device sleep state and the power disable state may be entered into directly from the PHYRDY state.

Figure 13:
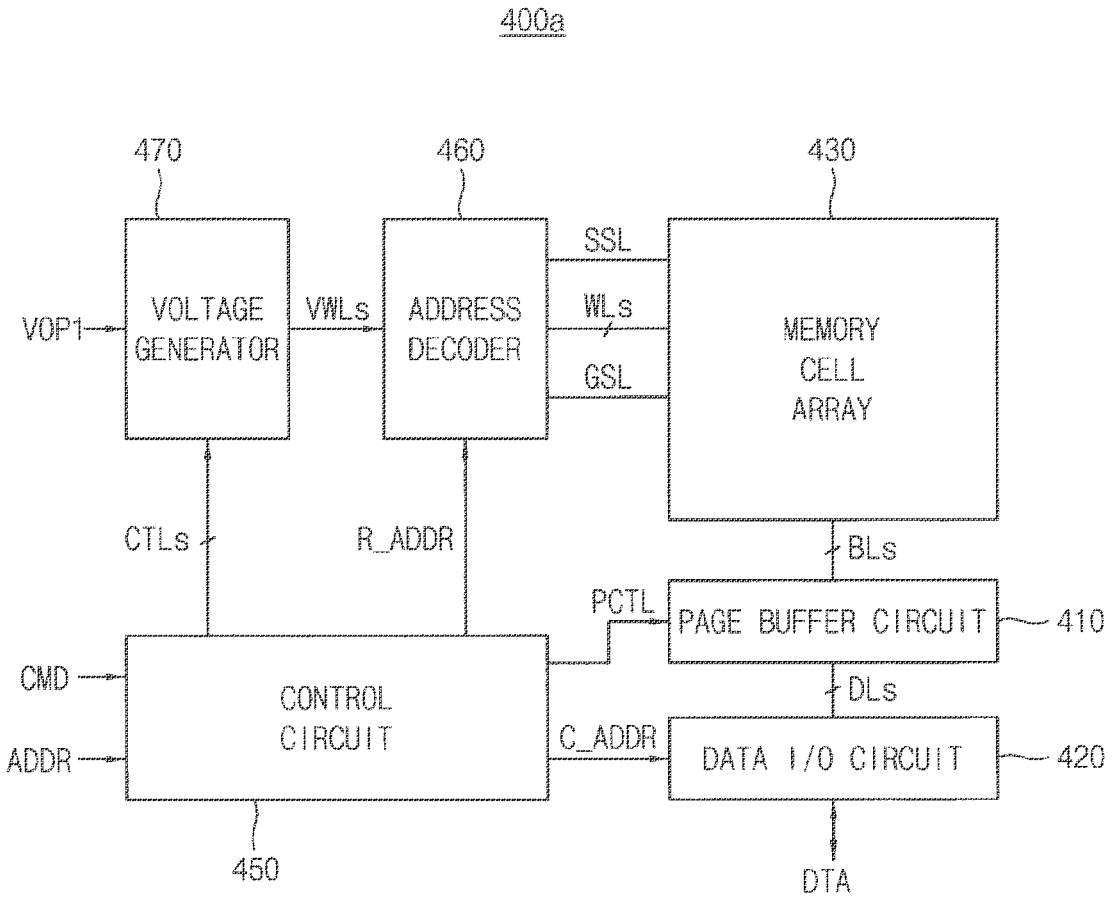
FIG. 13 is a block diagram illustrating one of the nonvolatile memory devices in the storage device in FIG. 1 according to an exemplary embodiment of the present inventive concept.

FIG. 13 is a block diagram illustrating one of the nonvolatile memory devices in the storage device in FIG. 1 according to an exemplary embodiment of the present inventive concept.

Referring to FIG. 13, in an exemplary embodiment, the nonvolatile memory device 400a includes a memory cell array 430, an address decoder 460, a page buffer circuit 410, a data input/output circuit 420, a control circuit 450, and a voltage generator 470.

The memory cell array 430 is coupled to the address decoder 460 through a string selection line SSL, a plurality of word lines WLs, and a ground selection line GSL. In addition, the memory cell array 430 is coupled to the page buffer circuit 410 through a plurality of bit lines BLs. The memory cell array 430 includes a plurality of memory cells coupled to the plurality of word lines WLs and the plurality of bit lines BLs. The memory cell array 430 may include a plurality of memory cells coupled to the plurality of word lines WLs stacked in a vertical direction which is perpendicular to a substrate.

Figure 14:
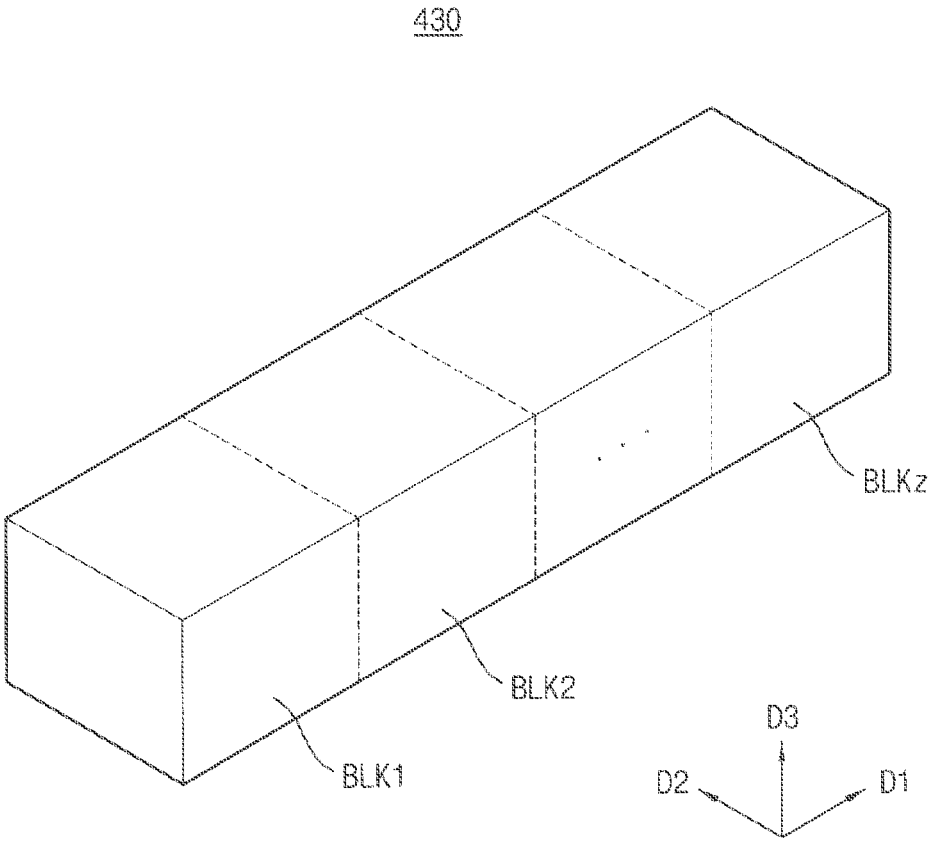
FIG. 14 is a block diagram illustrating the memory cell array in FIG. 13 according to an exemplary embodiment of the present inventive concept.

FIG. 14 is a block diagram illustrating the memory cell array in FIG. 13 according to an exemplary embodiment of the present inventive concept.

Referring to FIG. 14, in an exemplary embodiment, the memory cell array 430 includes a plurality of memory blocks BLK1 to BLKz, where z is a natural number greater than two. In an exemplary embodiment, the memory blocks BLK1 to BLKz are selected by the address decoder 460 in FIG. 13. For example, the address decoder 460 may select a memory block BLK corresponding to a block address from among the memory blocks BLK1 to BLKz.

Figure 15:
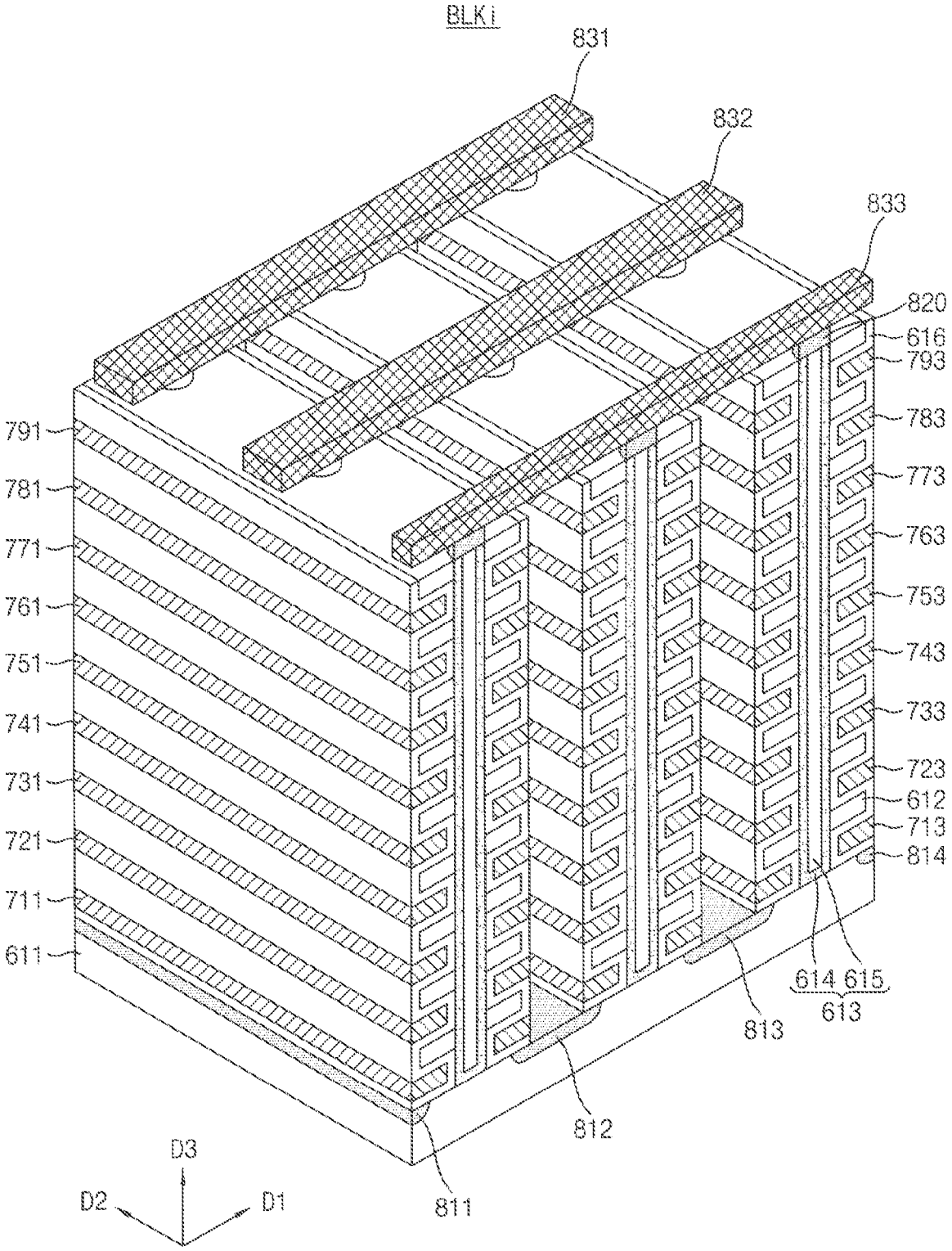
FIG. 15 is a perspective view illustrating one of the memory blocks of FIG. 14 according to an exemplary embodiment of the present inventive concept.

FIG. 15 is a perspective view illustrating one of the memory blocks of FIG. 14 according to an exemplary embodiment of the present inventive concept.

Referring to FIG. 15, in an exemplary embodiment, a memory block BLKi includes structures extending along the first to third directions D1~D3.

The memory block BLKi includes a substrate 611 provided. The substrate 611 may have, for example, a well of a first type (e.g., a first conductive type). For example, the substrate 611 may have a p-well formed by implanting a group 3 element such as boron (B). A plurality of doping regions 811 to 814 extending along the first direction D1 is provided in/on the substrate 611. The plurality of doping regions 811 to 814 may have, for example, a second type (e.g., a second conductive type) different from the first type of the substrate 611. In an exemplary embodiment, the first to fourth doping regions 811 to 814 have an n-type.

A plurality of insulation materials 612 extending along the second direction D2 are sequentially provided along the third direction D3 on a region of the substrate 611 between the first and second doping regions 811 and 812. For example, the plurality of insulation materials 612 are provided along the third direction D3, being spaced by a specific distance. Exemplarily, the insulation materials 612 may include an insulation material such as an oxide layer.

A plurality of pillars 613 penetrating the insulation materials along the third direction D3 is sequentially disposed along the second direction D2 on a region of the substrate 611 between the first and second doping regions 811 and 812. For example, the plurality of pillars 613 penetrate the insulation materials 612 to contact the substrate 611.

Each pillar 613 may include a plurality of materials. For example, a channel layer 614 of each pillar 613 may include a silicon material having a first type. For example, the channel layer 614 of each pillar 613 may include a silicon material having the same type as the substrate 611. In an exemplary embodiment, the channel layer 614 of each pillar 613 includes a p-type silicon. An internal material 615 of each pillar 613 includes an insulation material. For example, in an exemplary embodiment, the internal material 615 of each pillar 613 may include an insulation material such as a silicon oxide. For example, in an exemplary embodiment, the internal material 615 of each pillar 613 may include an air gap.

An insulation layer 616 is provided along the exposed surfaces of the insulation materials 612, the pillars 613, and the substrate 611, on a region between the first and second doping regions 811 and 812. In an exemplary embodiment, the insulation layer 616 provided on the exposed surface in the third direction D3 of the last insulation material 612 may be removed.

A plurality of first conductive materials 711 to 791 is provided between first and second doping regions 811 and 812 on the exposed surfaces of the insulation layer 616. For example, the first conductive material 711 extending along the second direction D2 is provided between the substrate 611 and the insulation material 612 adjacent to the substrate 611.

A first conductive material extending along the first direction D1 is provided between the insulation layer 616 at the top of a specific insulation material from among the insulation materials 612, and the insulation layer 616 at the bottom of a specific insulation material from among the insulation materials 612. For example, in an exemplary embodiment, a plurality of first conductive materials 721 to 781 extending along the first direction D1 is provided between the insulation materials 612, and the insulation layer 616 is provided between the insulation materials 612 and the first conductive materials 721 to 781. The first conductive materials 711 to 791 may include a metal material.

The same structures as those on the first and second doping regions 811 and 812 may be provided in a region between the second and third doping regions 812 and 813. In the region between the second and third doping regions 812 and 813, provided are a plurality of insulation materials 612 extending along the first direction D1, a plurality of pillars 613 disposed sequentially along the first direction D1 and penetrating the plurality of insulation materials 612 along the third direction D3, an insulation layer 616 provided on the exposed surfaces of the plurality of insulation materials 612 and the plurality of pillars 613, and a plurality of conductive materials 713 to 793 extending along the first direction D1.

In a region between the third and fourth doping regions 813 and 814, the same structures as those on the first and second doping regions 811 and 812 may be provided. In the region between the third and fourth doping regions 813 and 814, provided are a plurality of insulation materials 612 extending along the first direction D1, a plurality of pillars 613 disposed sequentially along the first direction D1 and penetrating the plurality of insulation materials 612 along the third direction D3, an insulation layer 616 provided on the exposed surfaces of the plurality of insulation materials 612 and the plurality of pillars 613, and a plurality of first conductive materials 713 to 793 extending along the first direction D1.

Drains 820 are provided on the plurality of pillars 613, respectively. On the drains, second conductive materials 831 to 833 extending along the first direction D1 are provided. The second conductive materials 831 to 833 are disposed along the second direction D2, and are spaced apart by a specific distance. The second conductive materials 831 to 833 are respectively connected to the drains 820 in a corresponding region. The drains 820 and the second conductive material 833 extending along the first direction D1 may be connected through each contact plug. The second conductive materials 831 to 833 may include metal materials. The second conductive materials 831 to 833 may include conductive materials such as a polysilicon.

Figure 16:
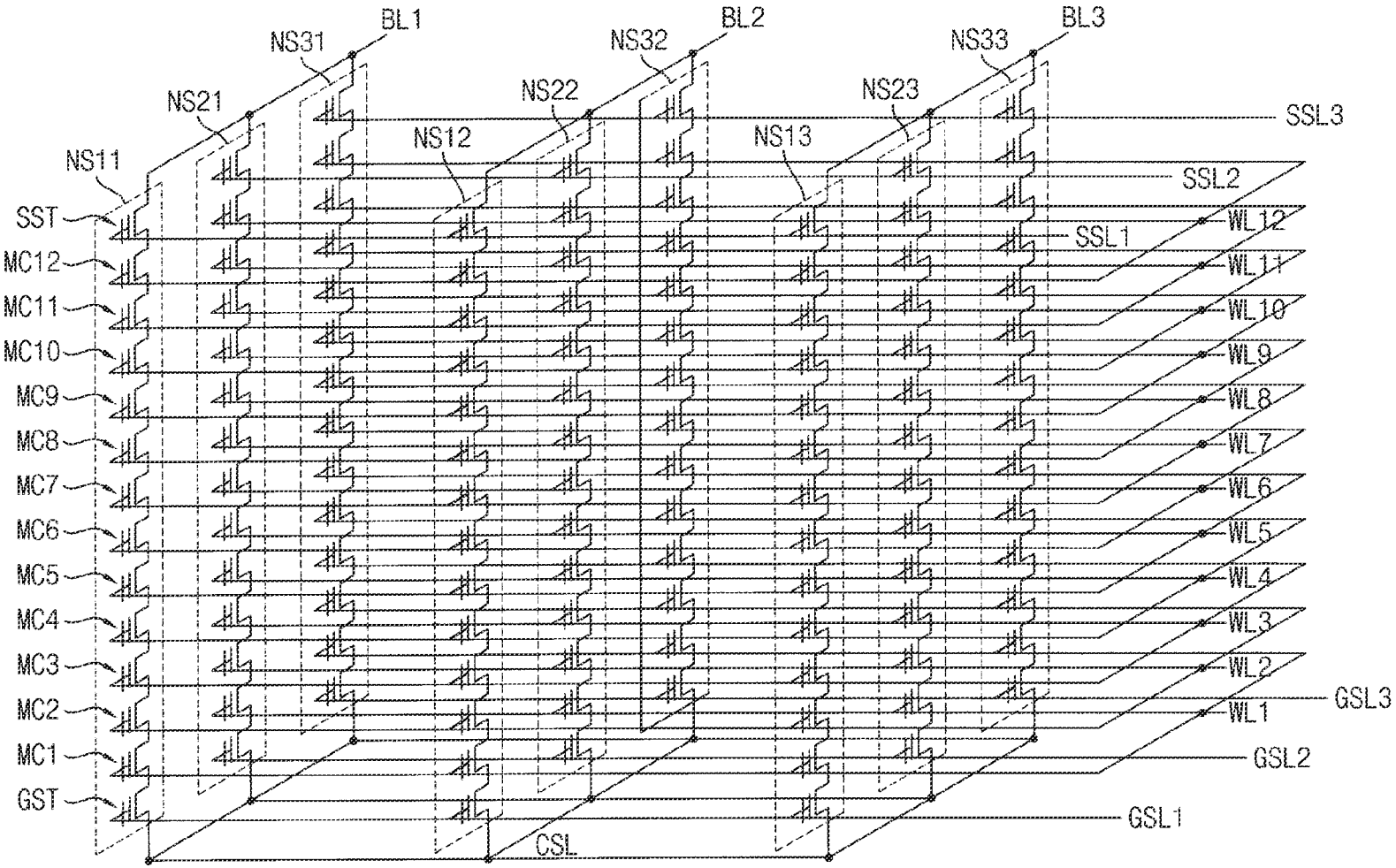
FIG. 16 is an equivalent circuit diagram illustrating the memory block of FIG. 15 according to an exemplary embodiment of the present inventive concept.

FIG. 16 is an equivalent circuit diagram illustrating the memory block of FIG. 15 according to an exemplary embodiment of the present inventive concept.

The memory block BLKi of FIG. 16 may be formed on a substrate in a three-dimensional structure (or a vertical structure). For example, a plurality of memory cell strings included in the memory block BLKa may be formed in a direction perpendicular to the substrate.

Referring to FIG. 16, in an exemplary embodiment, the memory block BLKi includes memory cell strings NS11 to NS33 coupled between bit lines BL1, BL2 and BL3 and a common source line CSL. Each of the memory cell strings NS11 to NS33 includes a string selection transistor SST, a plurality of memory cells MC1 to MC12, and a ground selection transistor GST.

The string selection transistor SST is connected to corresponding string selection lines SSL1 to SSL3. The memory cells MC1 to MC12 are connected to corresponding word lines WL1 to WL12, respectively. The ground selection transistor GST is connected to corresponding ground selection lines GSL1 to GSL3. The string selection transistor SST is connected to corresponding bit lines BL1, BL2 and BL3, and the ground selection transistor GST is connected to the common source line CSL.

Word lines WL1 to WL12 having the same height may be commonly connected, and the ground selection lines GSL1 to GSL3 and the string selection lines SSL1 to SSL3 may be separated.

Referring back to FIG. 13, the control circuit 450 may receive the command signal CMD and the address signal ADDR from the storage controller 300 and control an erase operation, a program operation, and a read operation of the nonvolatile memory device 400a based on the command signal CMD and the address signal ADDR.

For example, the control circuit 450 may generate control signals CTLs, which are used for controlling the voltage generator 470, based on the command signal CMD, and generate a row address R_ADDR and a column address C_ADDR based on the address signal ADDR. The control circuit 450 may provide the row address R_ADDR to the address decoder 460 and provide the column address C_ADDR to the data input/output circuit 420.

In an exemplary embodiment, the address decoder 460 is coupled to the memory cell array 430 through the string selection line SSL, the plurality of word lines WLs, and the ground selection line GSL.

In an exemplary embodiment, the voltage generator 470 generates word line voltages VWLs using the first operation voltage VOP1, which are used for the operation of the nonvolatile memory device 400a, based on the control signals CTLs. The word line voltages VWLs are applied to the plurality of word lines WLs through the address decoder 460.

In an exemplary embodiment, the page buffer circuit 410 is coupled to the memory cell array 430 through the plurality of bit lines BLs. The page buffer circuit 410 may include a plurality of page buffers. In exemplary embodiments, one page buffer may be connected to one bit line. In other exemplary embodiments, one page buffer may be connected to two or more bit-lines. The page buffer circuit 410 may temporarily store data to be programmed in a selected page or data read out from the selected page. The page buffer circuit 410 is controlled in response to a control signal PCTL received from the control circuit 450.

In an exemplary embodiment, the data input/output circuit 420 is coupled to the page buffer circuit 410 through data lines DLs. During the program operation, the data input/output circuit 420 may receive program data DTA from the storage controller 300 and provide the program data DTA to the page buffer circuit 410 based on the column address C_ADDR received from the control circuit 450. During the read operation, the data input/output circuit 420 may provide read data DTA, which is stored in the page buffer circuit 410, to the storage controller 300 based on the column address C_ADDR received from the control circuit 450.

Figure 17:
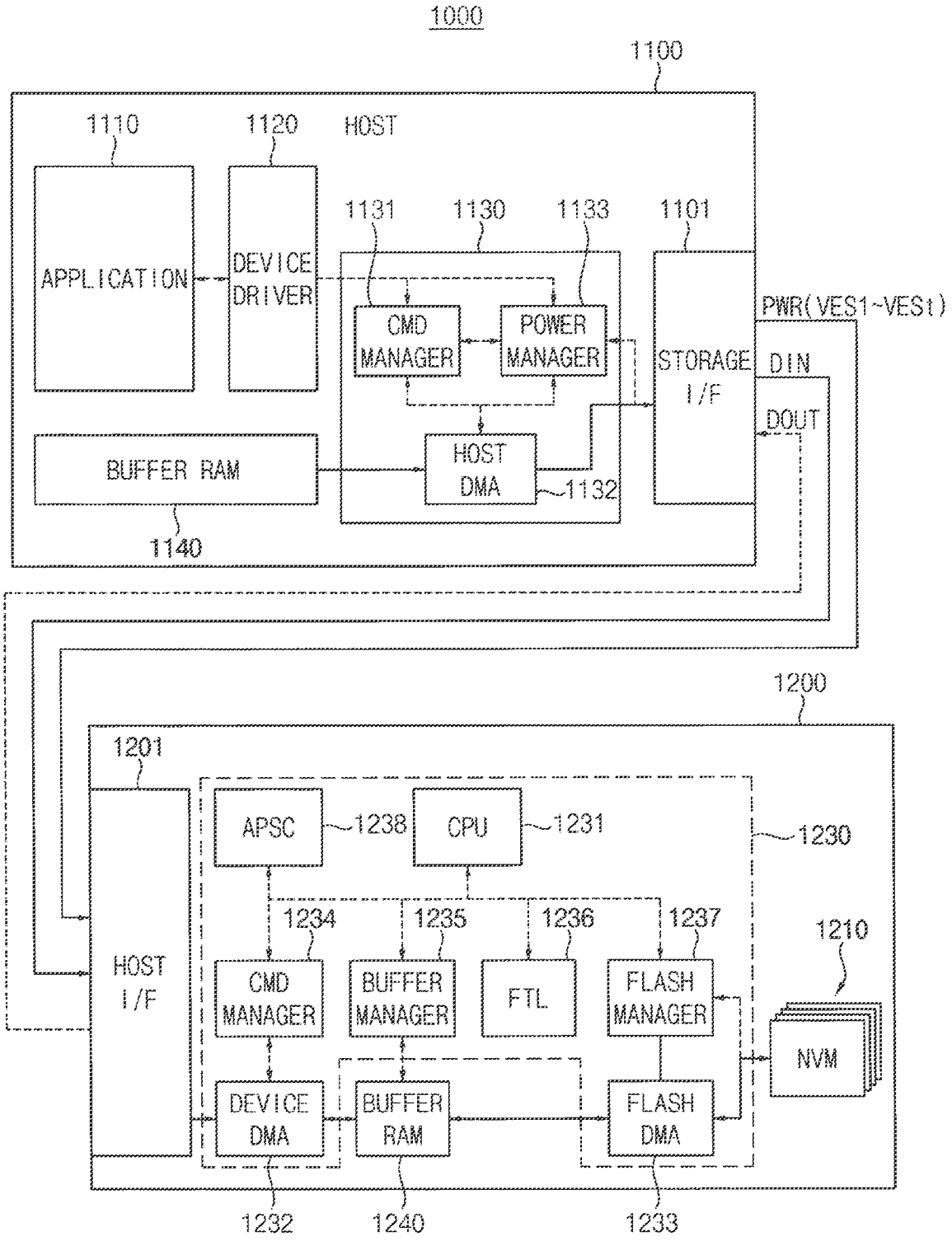
FIG. 17 is a block diagram illustrating a storage system according to an exemplary embodiment of the present inventive concept.

FIG. 17 is a block diagram illustrating a storage system according to an exemplary embodiment of the present inventive concept.

Referring to FIG. 17, in an exemplary embodiment, a storage system 1000 includes a host 1100 and a storage device 1200.

The host 1100 includes an application 1110, a device driver 1120, a host controller 1130, and buffer RAM 1140.

The host controller 1130 includes a command manager 1131, a host direct memory access (DMA) 1132, and a power manager 1133.

In operation, a system level command (e.g., a write command) is generated by the application 1110 and device driver 1120 of the host 1100, and is then provided to the command manager 1131 of the host controller 1130. The command manager 1131 may be used to generate a corresponding storage device command (e.g., a corresponding command or set of commands consistent with a protocol being implemented by the storage system 1000) that is provided to the storage device 1200 using the device driver 1120. The command generated by the command manager 1131 may also be provided to the host DMA 1132, which sends the command to the storage device 1200 via a host interface 1101.

The storage device 1200 includes a flash memory 1210, a device controller 1230, and a buffer random access memory (RAM) 1240. The device controller 1230 includes a central processing unit (CPU) 1231, a device DMA 1232, a flash DMA 1233, a command manager 1234, a buffer manager 1235, a flash translation layer (FTL) 1236, a flash manager 1237, and an adaptive power supply circuit 1238.

A command transferred from the host 1100 to the storage device 1200 may be provided to the device DMA 1232 via a device interface 1201. The device DMA 1232 may then communicate the received command to the command manager 1234. The command manager 1234 may be used to allocate memory space in the buffer RAM 1240 to receive corresponding write data via the buffer manager 1235. Once the storage device 1200 is ready to receive the write data, the command manager 1234 may communicate a transmission "ready" signal to the host 1100.

Upon receiving the transmission ready signal, the host 1100 will communicate the write data to the storage device 1200. The write data may be sent to the storage device 1200 using the host DMA 1132 and host interface 1101. The storage device 1200 may then store the received write data in the buffer RAM 1240 using the device DMA 1232 and the buffer manager 1235. The write data stored in the buffer RAM 1240 may then be provided to the flash manager 1237 via the flash DMA 1233. The flash manager 1237 may be used to program the write data according to addresses for the flash memory 1210 derived from an address mapping table by the flash translation layer 1236.

Once the transfer and programming of the write data is complete, the storage device 1200 may send a response to the host 1100 informing the host 1100 that the write command has been successfully executed. Based on the received response signal, the host 1100 indicates to the device driver 1120 and application 1110 that the command is complete, and will thereafter terminate execution of the operation corresponding to the command.

As described above, the host 1100 and storage device 1200 may exchange data corresponding commands and/or a control signal(s) (e.g., the ready and response signals) via data lines of the data segment (e.g., data lines DIN and DOUT). In addition, the host 1100 provides the storage device 1200 with power PWR including a plurality of power supply voltages VES1~VESt through power lines.

The storage device 1200 (e.g., the processor 1231) may selectively activate a power disable function of the adaptive power supply circuit 1238 based on whether the host 1100 and the storage device 1200 support the power disable function. Therefore, the storage device 1200 may be compatible with the host 1100 even though the host 1100 does not provide the power disable function. Therefore, performance of the storage system 1000 may be improved.

Figure 18:
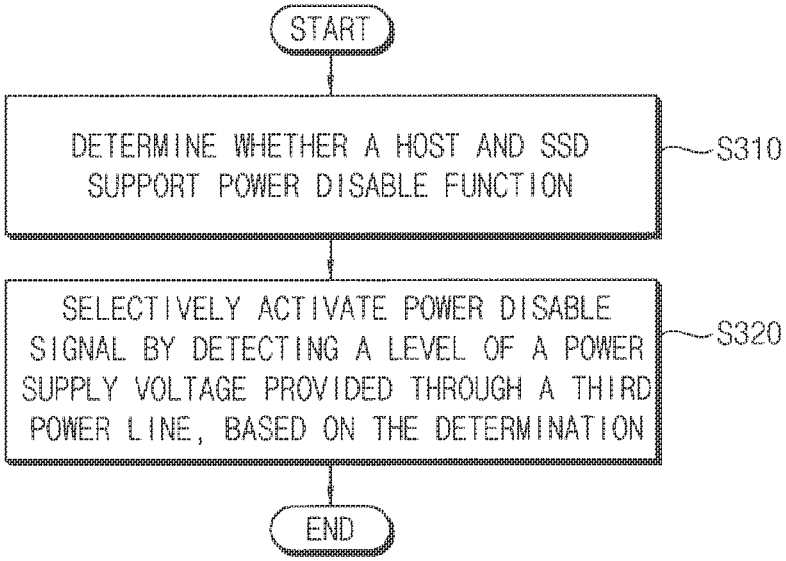
FIG. 18 is a flowchart illustrating a method of operating a storage device according to an exemplary embodiment of the present inventive concept.

FIG. 18 is a flowchart illustrating a method of operating a storage device according to an exemplary embodiment of the present inventive concept.

Referring to FIGS. 1 through 18, in a method of operating a storage device 200 that includes a plurality of nonvolatile memory devices 400a-400k that store data, and a storage controller 300 that controls the plurality of nonvolatile memory devices 400a-400k, the storage controller 300 determines whether the storage device 200 and a host 100 support a power disable function (S310). The host 100 provides the storage device 200 with data DTA and a plurality of power supply voltages VES1~VESt. An adaptive power supply circuit 500 in the storage device 200 generates a first operation voltage VOP1 and a second operation voltage VOP2 based on a first power supply voltage and a second power supply voltage of the plurality of power supply voltages, and selectively activates the power disable function according to a level of a third power supply voltage of the plurality of power supply voltages, based on the determination (S320).

To determine whether the storage device 200 and the host 100 support the power disable function, the processor 310 in the storage controller 300 checks first through third setting bits 371, 372 and 373, and selectively activates a power disable function setting control signal PEBS with a high level based on the result.

For example, when the host 100 always supports the power disable function or the host 100 currently supports the power disable function, the processor 310 activates the power disable function setting control signal PEBS with a high level. When the power disable function setting control signal PEBS is activated with a high level, the power controller 540b implements the power disable function by activating the power disable signal PWDIS based on the level of the third power supply voltage VES3.

For example, when the host 100 does not always support the power disable function, or when at least one of the host 100 and the storage device 200 does not support the power disable function, the processor 310 deactivates the power disable function setting control signal PEBS with a low level. The power controller 540b may deactivate the power disable signal PWDIS and the device sleep signal DEVSLP. Therefore, the load switch circuit 510b provides the first power supply voltage VES1 and the second power supply voltage VES2 to the PMIC 520b, and the PMIC 520b generates the first through third operation voltages VOP1, VOP2 and VOP3 based on the first power supply voltage VES1 and the second power supply voltage VES2.

When the storage device 200 supports the power disable function and the host 100 does not support the power disable function, the storage controller 300 deactivates the power disable function setting control signal PEBS with a low level, and the power controller 540a or 540b deactivates the power disable signal PWDIS with a low level. Therefore, when the host 100 always supplies the third power supply voltage VES3 with 3.3V through the third power line P3, a situation in which the power supplied to the storage device 200 is cut off does not occur. Therefore, the storage device 200 may increase compatibility with various servers and hosts, and performance may be improved.

Figure 19:
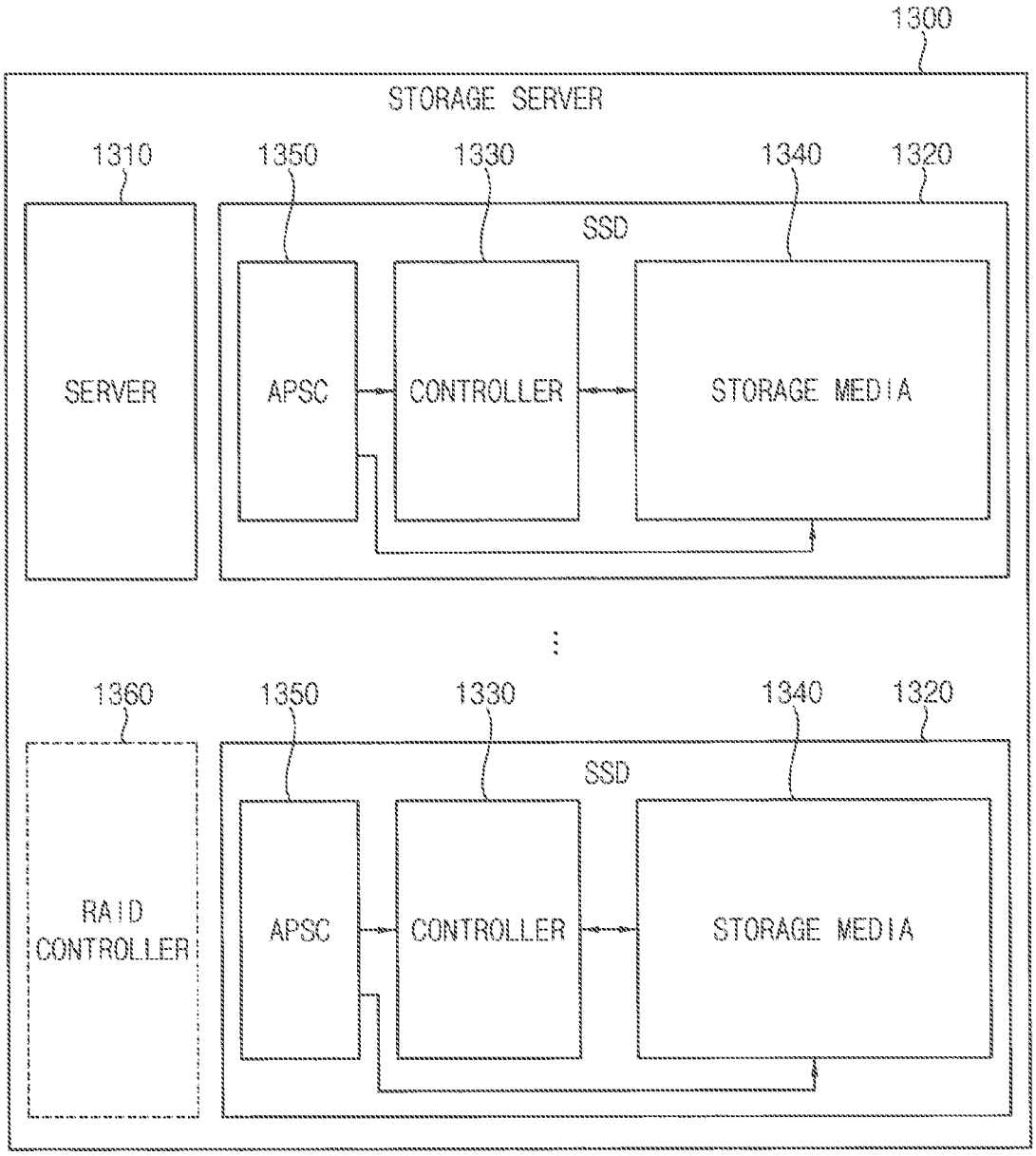
FIG. 19 is a block diagram illustrating an example of a storage server employing the storage device (e.g., SSD) according to an exemplary embodiment of the present inventive concept.

FIG. 19 is a block diagram illustrating an example of a storage server employing the storage device (e.g., SSD) according to an exemplary embodiment of the present inventive concept.

Referring to FIG. 19, in an exemplary embodiment, a storage server 1300 includes a server 1310, a plurality of SSDs 1320 which store data for operating the server 1310, and a raid controller 1360 that controls the SSDs 1320.

Redundant Array of Independent Drives (RAID) techniques are often used in data servers in which important data can be replicated in more than one location across a plurality a of storage devices. The raid controller 1360 may enable one of a plurality of RAID levels according to RAID information, and may interface data between the server 1310 and the SSDs 1320.

Each of the SSDs 1320 may include a storage media 1340 having a plurality of nonvolatile memory devices (flash memories), and a controller 1330 that controls the storage media 1340. The SSD 1320 may employ the storage device 200 in FIG. 1. The SSD 1320 may include an adaptive power supply circuit 1350, and the controller 1330 of the SSD 1320 may selectively activate a power disable function of the adaptive power supply circuit 1350 based on whether the storage server 1310 and the SSDs 1320 support the power disable function.

The adaptive power supply circuit 1350 may generate operation voltages based on power supply voltages from the storage server 1310, and may provide the storage media 1340 with a portion of the operation voltages. When the power disable function is set, the adaptive power supply circuit 1350 may adaptively activate the power disable function and the device sleep function based on a level of a third power supply voltage provided from the storage server 1310 through a third power line.

Figure 20:
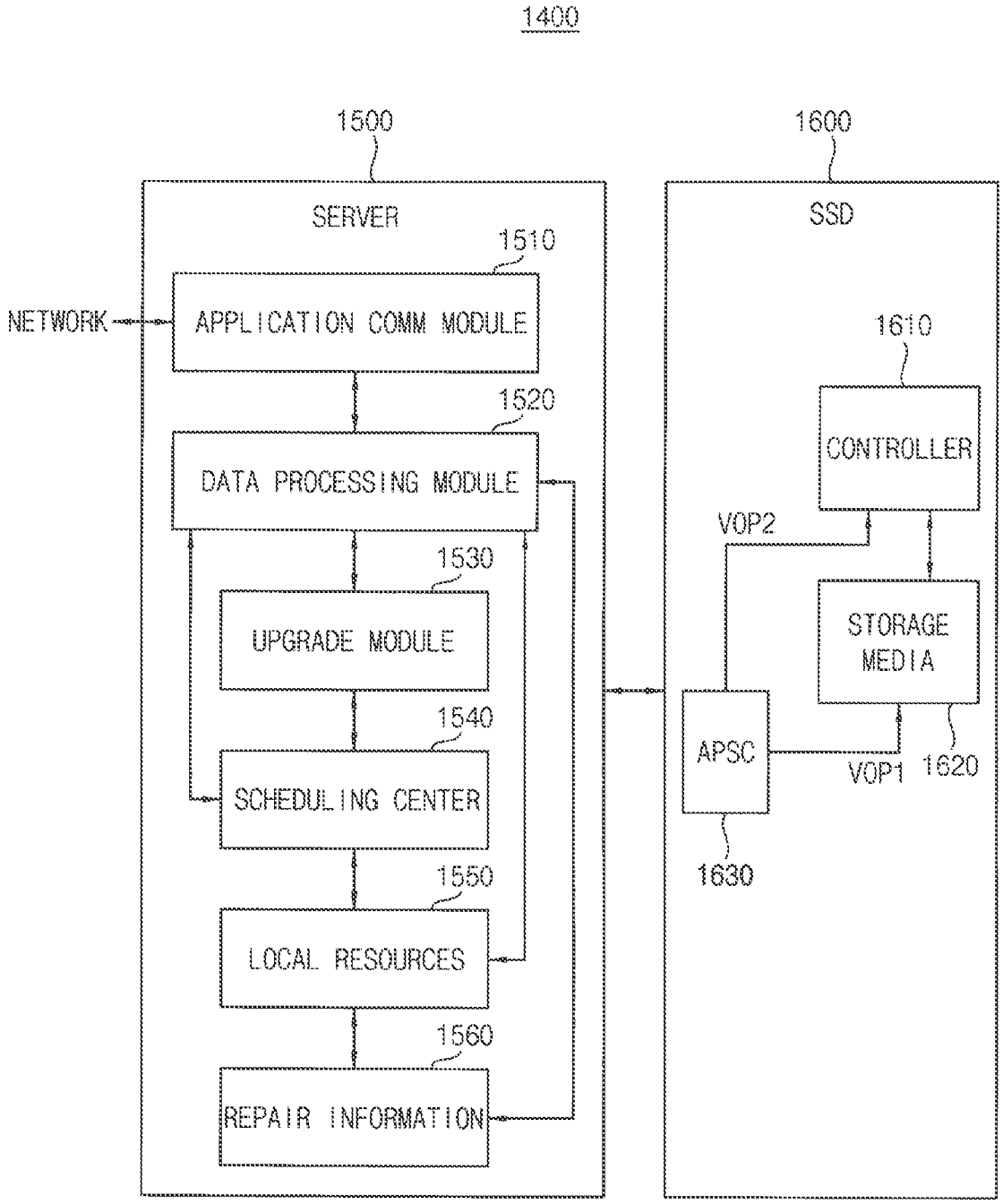
FIG. 20 is a block diagram illustrating an example of a server system that employs the SSD according to an exemplary embodiment of the present inventive concept.

FIG. 20 is a block diagram illustrating an example of a server system that employs the SSD according to an exemplary embodiment of the present inventive concept.

Referring to FIG. 20, in an exemplary embodiment, a server system 1400 includes a server 1500 and an SSD 1600, which stores data for operating the server 1500.

The server 1500 includes an application communication module 1510, a data processing module 1520, an upgrading module 1530, a scheduling center 1540, a local resource module 1550, and a repair information module 1560.

The application communication module 1510 may be implemented for communicating between the server 1500 and a computing system connected to a network, or may be implemented for communicating between the server 1500 and the storage device 1600. The application communication module 1510 transmits data or information received through the user interface to the data processing module 1520.

The data processing module 1520 is linked to the local resource module 1550. The local resource module 1550 may provide a user with repair shops, dealers and list of technical information based on the data or information input to the server 1500.

The upgrading module 1530 interfaces with the data processing module 1520. The upgrading module 1530 may upgrade firmware, reset code or other information to an appliance based on the data or information received from the SSD 1600.

The scheduling center 1540 permits real-time options to the user based on the data or information input to the server 1500.

The repair information module 1560 interfaces with the data processing module 1520. The repair information module 1560 may provide the user with information associated with repair (for example, audio file, video file or text file). The data processing module 1520 may pack associated information based on information from the SSD 1600. The packed information may be sent to the SSD 1600 and/or may be displayed to the user.

The SSD 1600 may employ the storage device 200 in FIG. 1. The SSD 1600 includes a controller 1610 and a storage medium 1620 implemented with a plurality of nonvolatile memory devices. The SSD 1600 further includes an adaptive power supply circuit 1630, and the controller 1610 selectively activates a power disable function of the adaptive power supply circuit 1630 based on whether the server 1500 and the SSD 1600 support the power disable function.

The adaptive power supply circuit 1630 generates a first operation voltage VOP1 and a second operation voltage VOP2 based on power supply voltages received from the server 1500. The adaptive power supply circuit 1630 may provide the first operation voltage VOP1 to the storage medium 1620 and may provide the second operation voltage VOP2 to the controller 1610.

A storage device or a storage system according to exemplary embodiments of the present inventive concept may be packaged using various package types or package configurations.

Exemplary embodiments of the present inventive concept may be applied to various electronic devices including storage devices.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary embodiments may be physically separated into two or more interacting and discrete blocks, units and/or modules without departing from the scope of the inventive concept. Further, the blocks, units and/or modules of the exemplary embodiments may be physically combined into more complex blocks, units and/or modules without departing from the scope of the inventive concept.

In exemplary embodiments of the present inventive concept, a three-dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an exemplary embodiment of the present inventive concept, the 3D memory array includes vertical NAND strings that are vertically oriented such that at least one memory cell is located over another memory cell. The at least one memory cell may include a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

While the present inventive concept has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A storage device, comprising:

a plurality of nonvolatile memory devices that store data;

a storage controller configured to control the plurality of nonvolatile memory devices; and an adaptive power supply circuit configured to generate at least one operation voltage based on at least one power supply voltage, and to provide the at least one operation voltage to the plurality of nonvolatile memory devices and the storage controller, wherein the at least one power supply voltage is provided to the adaptive power supply circuit through a portion of a plurality of power lines connected to a host, wherein, under control of the storage controller, the adaptive power supply circuit is configured to adaptively activate a power disable function associated with a provision of the at least one operation voltage according to a level of a third power supply voltage provided through a third power line of the plurality of power lines, wherein the third power supply voltage is provided by the host, wherein the adaptive power supply circuit comprises a power controller configured to selectively activate a power disable signal associated with activation of the power disable function in response to a power disable function setting control signal and the level of the third power supply voltage.

2. The storage device of claim 1, wherein the adaptive power supply circuit further comprises:

a load switch controller configured to provide a switch enable control signal in response to a level of the at least one power supply voltage and the power disable signal, wherein the power disable function setting signal is provided from the storage controller;

a load switch circuit configured to provide a switching power supply voltage by switching the at least one power supply voltage in response to the switch enable control signal; and a power management integrated circuit (PMIC) connected to the load switch circuit, wherein the PMIC is configured to generate the at least one operation voltage in response to the switching power supply voltage.

3. The storage device of claim 2, wherein the power controller comprises:

a state machine configured to change a level of a setting control signal in response to the power disable function setting control signal; and a voltage sensor configured to selectively activate the power disable signal in response to the setting control signal and the level of the third power supply voltage.

4. The storage device of claim 3, wherein the power controller is configured to:

deactivate the power disable signal when the power disable function setting control signal is activated and the level of the third power supply voltage is smaller than a level of a reference voltage; and activate the power disable signal when the power disable function setting control signal is activated and the level of the third power supply voltage is greater than the level of the reference voltage.

5. The storage device of claim 3, wherein the voltage sensor comprises:

a voltage detector configured to detect the level of the third power supply voltage and provide a detected voltage; and a comparator configured to be activated in response to the setting control signal, to compare the detected voltage and a reference voltage, and to output the power disable signal in response to a comparison result.

6. The storage device of claim 3, wherein the voltage sensor comprises:

a voltage detector configured to detect the level of the third power supply voltage and provide a detected voltage; and an analog-to-digital converter configured to be activated in response to the setting control signal, to convert the detected voltage to a corresponding digital value, to compare the digital value and a reference digital value, and to output the power disable signal in response to a comparison result.

7. The storage device of claim 2, wherein the load switch controller comprises:

a voltage detector configured to output a switch enable signal based on a level of the at least one power supply voltage;

an inverter configured to invert the power disable signal; and an AND gate configured to provide the switch enable control signal by performing an AND operation on the switch enable control signal and an output of the inverter.

8. The storage device of claim 1, wherein:

the at least one power supply voltage comprises a first power supply voltage and a second power supply voltage, and the at least one operation voltage comprises a first operation voltage and a second operation voltage;

the adaptive power supply circuit is configured to provide the first operation voltage to the nonvolatile memory devices, and to provide the second operation voltage to the storage controller; and the adaptive power supply circuit is further configured to adaptively activate a device sleep function according to the level of the third power supply voltage in response to a setting of the storage controller, wherein the setting of the storage controller is based on whether the storage device and the host support the power disable function.

9. The storage device of claim 8, wherein:

the storage controller determines whether the storage device and the host support the power disable function by checking a setting register set included in the storage controller; and the setting register set comprises:

a first register that stores a first setting bit that indicates whether the host always supports the power disable function;

a second register that stores a second setting bit that indicates whether the storage device supports the power disable function; and a third register that stores a third setting bit that indicates whether the host currently supports the power disable function.

10. The storage device of claim 9, wherein:

the third setting bit is changeable by a request of the host; and a processor in the storage controller is configured to provide a power disable function setting control signal to the adaptive power supply circuit by checking the first setting bit, the second setting bit, and the third setting bit.

11. The storage device of claim 10, wherein the processor is configured to activate the power disable function setting control signal when the first setting bit indicates that the host always supports the power disable function.

12. The storage device of claim 10, wherein the processor is configured to activate the power disable function setting control signal when the first setting bit indicates that the host does not always support the power disable function, the second setting bit indicates that the storage device supports the power disable function, and the third setting bit indicates that the host currently supports the power disable function.

13. The storage device of claim 10, wherein the processor is configured to deactivate the power disable function setting control signal when at least one of the storage device and the host does not support the power disable function.

14. The storage device of claim 8, wherein the adaptive power supply circuit comprises:

a voltage detector configured to provide a first detected voltage and a second detected voltage by detecting the level of the third power supply voltage;

a power controller configured to selectively activate a power disable signal and a device sleep signal based on a level of the first detected voltage and a level of the second detected voltage, in response to a power disable setting control signal provided from the storage controller;

a load switch controller configured to switch the first power supply voltage and the second power supply voltage in response to the power disable signal;

a load switch circuit; and a power management integrated circuit (PMIC) connected to the load switch circuit, wherein the PMIC is configured to selectively generate the first operation voltage and the second operation voltage based on the first power supply voltage and the second power supply voltage, in response to the device sleep signal.

15. The storage device of claim 14, wherein the power controller comprises:

a first comparator configured to be activated in response to a first setting control signal, to activate the power disable signal, and to provide the power disable signal to the load switch circuit based on a comparison of the first detected voltage and a first reference voltage;

a second comparator configured to be activated in response to a second setting control signal, to activate the device sleep signal, and to provide the device sleep signal to the load switch circuit based on a comparison of the second detected voltage and a second reference voltage; and a state machine configured to selectively activate the first setting control signal and the second setting control signal in response to a power disable function setting control signal, wherein the first reference voltage is greater than the second reference voltage.

16. The storage device of claim 15, wherein:

the storage controller is configured to provide the power disable function setting control signal to the state machine through a side-band signaling; and the state machine is configured to activate the first setting control signal and the second setting control signal when the power disable function setting control signal is activated.

17. The storage device of claim 1, wherein each of the plurality of nonvolatile memory devices comprises a memory cell array, and the memory cell array comprises a plurality of memory cells coupled to a plurality of word lines stacked in a vertical direction that is perpendicular to a substrate.

18. A storage system, comprising:

a storage device configured to receive data through a data line and to receive a plurality of power supply voltages through a plurality of power lines; and a host connected to the storage device through the data line and the power lines, wherein the host is configured to control the storage device, wherein the storage device comprises:

a plurality of nonvolatile memory devices that store data;

a storage controller configured to control the plurality of nonvolatile memory devices; and an adaptive power supply circuit configured to generate at least one operation voltage based on at least one power supply voltage, and to provide the at least one operation voltage to the plurality of nonvolatile memory devices and the storage controller, wherein the at least one power supply voltage is provided to the adaptive power supply circuit through a portion of the power lines, wherein, under control of the storage controller, the adaptive power supply circuit is configured to adaptively activate a power disable function associated with a provision of the at least one operation voltage according to a level of a third power supply voltage provided through a third power line of the power lines, wherein the third power supply voltage is provided by the host, wherein the adaptive power supply circuit comprises a power controller configured to selectively activate a power disable signal associated with activation of the power disable function in response to a power disable function setting control signal and the level of the third power supply voltage.

19. A method of operating a storage device, the method comprising:

determining, in a storage controller, whether the storage device and a host support a power disable function, wherein the storage device comprises the storage controller and a plurality of nonvolatile memory devices that store data, and the storage controller is configured to control the nonvolatile memory devices, wherein the host provides the data and a plurality of power supply voltages to the storage device;

generating, in a power management integrated circuit (PMIC), a first operation voltage and a second operation voltage based on a first power supply voltage and a second power supply voltage from among the plurality of power supply voltages, wherein the power disable function is adaptively activated, in the storage controller, according to a level of a third power supply voltage from among the plurality of power supply voltages, based on determining whether the storage device and the host support the power disable function; and selectively activating a power disable signal associated with activation of the power disable function in response to a power disable function setting control signal and the level of the third power supply voltage.

20. The method of claim 19, wherein determining whether the storage device and the host support the power disable function comprises:

determining, in the storage controller, whether the host always supports the power disable function;

determining, in the storage controller, whether the storage device supports the power disable function when the host does not always support the power disable function;

determining, in the storage controller, whether the host currently supports the power disable function when the host does not always support the power disable function and when the storage device supports the power disable function; and setting, in the storage controller, the power disable function to an active state when the host supports the power disable function.

*21. An apparatus comprising:*

*a first nonvolatile memory;*

*a second nonvolatile memory;*

*a volatile memory;*

*a storage controller coupled to the first nonvolatile memory, the second nonvolatile memory and the volatile memory;*

*a first power line;*

*a second power line; and*

*a power management integrated circuit (PMIC) configured to receive a first voltage through the first power line and a second voltage through the second power line, to generate a third voltage based on the first voltage and to generate a fourth voltage based on the second voltage,*

*wherein the storage controller is configured to determine a provision of the third voltage used by the first nonvolatile memory, and the PMIC is configured to provide the third voltage to the first nonvolatile memory,*

*wherein the PMIC is configured to provide the fourth voltage to the volatile memory, and*

*wherein the PMIC is configured to generate a fifth voltage based at least in part on the first voltage, and to provide the fifth voltage to the second nonvolatile memory, the fifth voltage being associated with operating the second nonvolatile memory.*

*22. An apparatus comprising:*

*a first memory;*

*a second memory;*

*a storage controller coupled to the first memory and the second memory;*

*a power line; and*

*a power management integrated circuit (PMIC) configured to receive a first voltage through the power line, to generate a second voltage based on the first voltage and to provide the second voltage to the first memory, the first voltage being associated with operating the first memory and the second memory,*

*wherein the PMIC is configured to generate a third voltage based at least in part on the first voltage and to provide the third voltage to the second memory,*

*wherein the third voltage is associated with operating the second memory, and*

*wherein the storage controller is configured to determine a provision of the first voltage used by the first memory, and transmit a first signal on the provision of the first voltage to the PMIC.*

*23. The apparatus of claim 22, wherein the PMIC is configured to receive the first voltage from an external device.*

*24. The apparatus of claim 22, wherein the storage controller is configured to receive a second signal to control a level of the third voltage, and*

*the storage controller is configured to determine the provision of the first voltage based at least in part on the second signal.*

*25. The apparatus of claim 22, wherein the first memory is a nonvolatile memory, and the second memory is a volatile memory.*

*26. The apparatus of claim 22, wherein each of the first memory and the second memory is a nonvolatile memory.*

*27. The apparatus of claim 22, further comprising a volatile memory,*

*wherein the PMIC is configured to generate a fourth voltage based on a fifth voltage received from an external device and provides the fourth voltage to the volatile memory.*

*28. A method comprising:*

*receiving a plurality of voltages including a first voltage and a second voltage associated with operating a first memory and a second memory among a plurality of memories;*

*generating, by a power management integrated circuit (PMIC), a third voltage associated with operating the first memory based at least in part on the first voltage;*

*generating, by the PMIC, a fourth voltage associated with operating the second memory based at least in part on the second voltage;*

*determining, by a storage controller, a provision of the first voltage used by the first memory based on a level of at least one of the plurality of voltages;*

*providing the third voltage to the first memory; and*

*providing the fourth voltage to the second memory.*

*29. The method of claim 28, further comprising transmitting, by the storage controller, a first signal on the provision of the first voltage to the PMIC.*

*30. The method of claim 28, further comprising:*

*generating, by the PMIC, a fifth voltage based at least in part on the first voltage, the fifth voltage being associated with operating the second memory; and*

*providing the fifth voltage to the second memory.*

*31. The method of claim 30, further comprising receiving, by the storage controller, a second signal to control a level of the fifth voltage,*

*wherein the determining the provision of the first voltage used by the first memory is based at least in part on the second signal.*

*32. The method of claim 28, further comprising providing the first voltage to the first memory, to the second memory among the plurality of memories, or to both the first memory and the second memory,*

*wherein the first voltage is associated with operating the second memory.*

*33. The method of claim 28, wherein the first memory is a nonvolatile memory, and the second memory is a volatile memory.*

*34. The method of claim 28, wherein each of the first memory and the second memory is a nonvolatile memory.*

* * * * *